(12) United States Patent
Jung et al.

(10) Patent No.: US 12,086,345 B2
(45) Date of Patent: Sep. 10, 2024

(54) SENSING PANEL AND DISPLAY DEVICE INCLUDING SENSING PANEL

(71) Applicant: Samsung Display Co., LTD., Yongin-si (KR)

(72) Inventors: Keum Dong Jung, Yongin-si (KR); Hyoung Wook Jang, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/103,591

(22) Filed: Jan. 31, 2023

(65) Prior Publication Data

US 2023/0350512 A1    Nov. 2, 2023

(30) Foreign Application Priority Data

May 2, 2022   (KR) .......................... 10-2022-0054419

(51) Int. Cl.
*G06F 3/041* (2006.01)
*G06F 3/044* (2006.01)
*G06V 40/13* (2022.01)

(52) U.S. Cl.
CPC .......... *G06F 3/0416* (2013.01); *G06F 3/0445* (2019.05); *G06F 3/0446* (2019.05); *G06V 40/1306* (2022.01); *G06F 2203/04111* (2013.01)

(58) Field of Classification Search
None
See application file for complete search history.

(56) References Cited

U.S. PATENT DOCUMENTS

| 10,467,449 | B2 | 11/2019 | Jang et al. | |
| 2016/0350571 | A1* | 12/2016 | Han | G06F 3/04164 |
| 2018/0068156 | A1* | 3/2018 | Jang | G06V 40/1306 |
| 2021/0200360 | A1* | 7/2021 | Lee | G06F 3/0412 |

FOREIGN PATENT DOCUMENTS

| CN | 111665991 | 9/2020 |
| KR | 10-1786119 | 10/2017 |
| KR | 10-2018-0026597 | 3/2018 |
| KR | 10-2021-0086143 | 7/2021 |
| WO | 2010/099132 | 9/2010 |

* cited by examiner

*Primary Examiner* — Stephen T. Reed
(74) *Attorney, Agent, or Firm* — KILE PARK REED & HOUTTEMAN PLLC

(57) ABSTRACT

A sensing panel includes a touch sensor that obtains information of a touch input in a sensing area, and a biometric sensor that obtains biometric information in a biometric sensing area. The touch sensor includes sensing pattern layers in the sensing area. The sensing pattern layers include cell electrodes and bridge electrodes electrically connecting the cell electrodes. The biometric sensor includes biometric sensing pattern layers in the biometric sensing area and trace lines electrically connected to the biometric sensing pattern layers. The trace lines and at least a portion of the bridge electrodes are disposed on a same layer. The trace lines bypass the bridge electrodes in a plan view.

20 Claims, 20 Drawing Sheets

PXL: SPXL1, SPXL2, SPXL3

BRP: BRP1, BRP2

SENSING PANEL AND DISPLAY DEVICE INCLUDING SENSING PANEL

CROSS REFERENCE TO RELATED APPLICATION(S)

This application claims priority to and benefits of Korean Patent Application No. 10-2022-0054419 under 35 U.S.C. § 119, filed on May 2, 2022, the entire content of which are incorporated herein by reference.

BACKGROUND

1. Technical Field

Embodiments relate to a sensing panel and a display device including the sensing panel.

2. Description of the Related Art

As information technology is developed, importance of a display device, which is a connection medium between a user and information, has been highlighted. Thus, a display device such as a liquid crystal display device and an organic light emitting display device has been used in various fields.

The display device may include a display panel for displaying an image and a sensing panel for sensing an object. The sensing panel may be used to check a touch position of a touch input provided by a user.

The display device may include a biometric sensor (e.g., a fingerprint sensor) for sensing a biometric input (e.g., a fingerprint input) of the user. The fingerprint sensor may obtain information of the fingerprint input provided by the user.

For example, a space in which lines for operating the fingerprint sensor are disposed is required to be properly ensured. For example, a sensing panel, in which a touch specification of the user is satisfied, is demanded.

SUMMARY

Embodiments provide a sensing panel and a display device including the sensing panel including a biometric sensor (e.g., a fingerprint sensor) capable of performing a biometric sensing operation without degrading a touch sensing operation and degrading a luminance of the display device.

However, embodiments of the disclosure are not limited to those set forth herein. The above and other embodiments will become more apparent to one of ordinary skill in the art to which the disclosure pertains by referencing the detailed description of the disclosure given below.

In an embodiment, a sensing panel may include a touch sensor that obtains information of a touch input in a sensing area, and a biometric sensor that obtains biometric information in a biometric sensing area. The touch sensor may include sensing pattern layers in the sensing area. The sensing pattern layers may include cell electrodes and bridge electrodes electrically connecting the cell electrodes. The biometric sensor may include biometric sensing pattern layers in the biometric sensing area and trace lines electrically connected to the biometric sensing pattern layers. The trace lines and at least a portion of the bridge electrodes may be on a same layer. The trace lines may bypass the bridge electrodes in a plan view.

The biometric sensing area may be surrounded by the sensing area.

The biometric sensing area may overlap the biometric sensing pattern layers and may not overlap the sensing pattern layers in a plan view.

The biometric sensing pattern layers may include first biometric sensing pattern layers extending in a first extension direction and second biometric sensing pattern layers extending in a second extension direction different from the first extension direction. Sensing nodes may be formed in an area where the first biometric sensing pattern layers and the second biometric sensing pattern layers overlap each other.

The first biometric sensing pattern layers and the second biometric sensing pattern layers may be disposed on different layers. The second biometric sensing pattern layers and the cell electrodes of the sensing pattern layers may be disposed on a same layer.

The trace lines may include a first trace line and a second trace line. The first biometric sensing pattern layers, the first trace line, and the second trace line may be disposed on different layers. The second biometric sensing pattern layers, the first trace line, and the second trace line may be disposed on a same layer. The first biometric sensing pattern layer may be electrically connected to the first trace line through a contact member passing through an insulating layer disposed between the first trace line and the first biometric sensing pattern layer.

At least a portion of the trace lines may be disposed in the sensing area, and the trace lines may electrically connect the biometric sensing pattern layers and a biometric sensing pad disposed outside the sensing area.

The sensing pattern layers may include first sensing pattern layers and second sensing pattern layers. The first sensing pattern layers may include first cell electrodes of the cell electrodes and first bridge electrodes of the bridge electrodes. The second sensing pattern layers may include second cell electrodes of the cell electrodes and second bridge electrodes of the bridge electrodes. The first bridge electrodes and the trace lines may be disposed on a first layer. The first cell electrodes, the second cell electrodes, and the second bridge electrodes may be disposed on a second layer different from the first layer.

The cell electrodes of the sensing pattern layers may cover the trace lines.

At least a portion of the trace lines may have a curved shape to be spaced apart from the bridge electrodes. The biometric sensor may be a fingerprint sensor, the biometric sensing area may be a fingerprint sensing area, the biometric information may be fingerprint information, and the biometric sensing pattern layers may be fingerprint sensing pattern layers.

The sensing panel may be configured to operate in a biometric sensing mode or a touch sensing mode. In case that the sensing panel operates in the biometric sensing mode, a sensor driver of the sensing panel may process biometric information of a biometric provided in the biometric sensing area. In case that the sensing panel operates in the touch sensing mode and in case that a touch event occurs in the biometric sensing area, the sensor driver may obtain information of the touch event based on mutual capacitance information in the sensing pattern layers.

A first length of the biometric sensing area extending in a first extension direction may be substantially n times of a first length of each of the sensing pattern layers extending in the first extension direction. A second length of the biometric sensing area extending in a second extension direction different from the first extension direction may be substantially m times of a second length of each of the sensing pattern layers extending in the second extension direction. n and m may be natural numbers.

The cell electrodes of the sensing pattern layers may have a mesh structure. The sensing pattern layers may include first sensing pattern layers and second sensing pattern layers. The first sensing pattern layers and the second sensing pattern layers may have a same shape.

The biometric sensing pattern layers may include first biometric sensing pattern layers and second biometric sensing pattern layers. The biometric sensor may be configured to obtain the biometric information based on mutual capacitance information of the first biometric sensing pattern layers and the second biometric sensing pattern layers.

In an embodiment, a display device may include a display panel including pixels that emit light, and a sensing panel disposed on the display panel, the sensing panel including a touch sensor that obtains information of a touch input in a sensing area and a biometric sensor that obtains biometric information in a biometric sensing area. The touch sensor may include sensing pattern layers disposed in the sensing area. The sensing pattern layers may include cell electrodes and bridge electrodes electrically connecting the cell electrodes. The biometric sensor may include biometric sensing pattern layers disposed in the biometric sensing area and trace lines electrically connected to the biometric sensing pattern layers. The trace lines and at least a portion of the bridge electrodes may be disposed on a same layer. The trace lines may bypass the bridge electrodes in a plan view.

The sensing pattern layers may include first sensing pattern layers and second sensing pattern layers. The first sensing pattern layers may include first cell electrodes of the cell electrodes and first bridge electrodes of the bridge electrodes. The second sensing pattern layers may include second cell electrodes of the cell electrodes and second bridge electrodes of the bridge electrodes. The first bridge electrodes and the trace lines may be disposed on a first layer. The first cell electrodes, the second cell electrodes, and the second bridge electrodes may be disposed on a second layer different from the first layer.

The display device may further include a color filter layer disposed on the sensing panel. The color filter layer may include color filters and a light blocking layer disposed between the color filters. The light blocking layer may overlap conductive layers for forming the sensing pattern layers, the biometric sensing pattern layers, and the trace lines in a plan view.

A resolution of the pixels may be about $\sqrt{2}$ times of a resolution of the biometric sensor in the biometric sensing area.

Each of the pixels may include pixel units each including a first sub-pixel, a (2_1)-th sub-pixel, a (2_2)-th sub-pixel, and a third sub-pixel. The biometric sensing pattern layers may include first biometric sensing pattern layers extending in a first extension direction and second biometric sensing pattern layers extending in a second extension direction different from the first extension direction. The first biometric sensing pattern layers and the second biometric sensing pattern layers may intersect to form sensing nodes. The sensing nodes may define biometric area holes in a plan view, and may include a first node, a second node, a third node, and a fourth node. The first sub-pixel may be adjacent to the first node. The (2_1)-th sub-pixel may be adjacent to the second node. The (2_2)-th sub-pixel may be adjacent to the third node. The third sub-pixel may be adjacent to the fourth node.

The display device may be a flexible display device. The biometric sensor may be a fingerprint sensor, the biometric sensing area may be a fingerprint sensing area, the biometric information may be fingerprint information, and the biometric sensing pattern layers may be fingerprint sensing pattern layers.

According to one or more embodiments, a sensing panel and a display device including the sensing panel including a biometric sensor and in which sensing performance of the sensing panel is sufficiently ensured may be provided.

BRIEF DESCRIPTION OF THE DRAWINGS

The above and other features of the disclosure will become more apparent by describing in further detail embodiments thereof with reference to the accompanying drawings, in which.

DETAILED DESCRIPTION OF THE EMBODIMENTS

Figure 1:
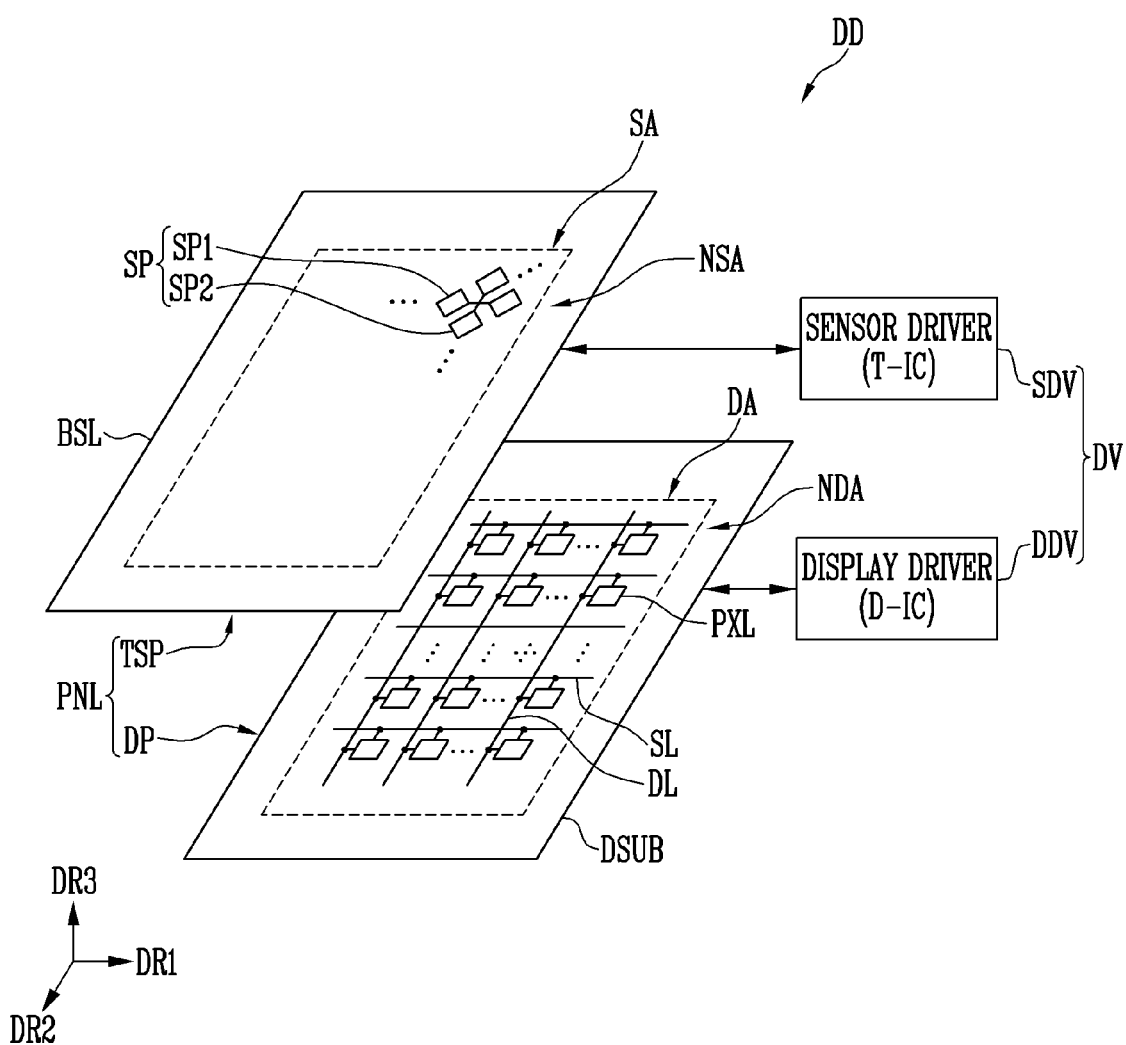
FIG. 1 is a schematic diagram illustrating a display device according to one or more embodiments.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

Unless otherwise specified, the illustrated embodiments are to be understood as providing features of the invention. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the DR1-axis, the DR2-axis, and the DR3-axis are not limited to three axes of a rectangular coordinate system, such as the X, Y, and Z-axes, and may be interpreted in a broader sense. For example, the DR1-axis, the DR2-axis, and the DR3-axis may be perpendicular to one another, or may represent different directions that are not perpendicular to one another. Further, the X-axis, the Y-axis, and the Z-axis are not limited to three axes of a rectangular coordinate system, such as the x, y, and z axes, and may be interpreted in a broader sense. For example, the X-axis, the Y-axis, and the Z-axis may be perpendicular to one another, or may represent different directions that are not perpendicular to one another. For the purposes of this disclosure, "at least one of A and B" may be construed as understood to mean A only, B only, or any combination of A and B. Also, "at least one of X, Y, and Z" and "at least one selected from the group consisting of X, Y, and Z" may be construed as X only, Y only, Z only, or any combination of two or more of X, Y, and Z. As used herein, the term "and/or" includes any and all combinations of one or more of the associated listed items.

Terms of "first", "second", and the like may be used to describe various components, but the components should not be limited by the terms. The terms are used only for the purpose of distinguishing one component from another component. For example, without departing from the scope of the disclosure, a first component may be referred to as a second component, and similarly, a second component may also be referred to as a first component. In the following description, the singular expressions include plural expressions unless the context clearly dictates otherwise.

It should be understood that in the disclosure, a term of "include", "have", or the like is used to specify that there is a feature, a number, a step, an operation, a component, a part, or a combination thereof described in the specification, but does not exclude a possibility of the presence or addition of one or more other features, numbers, steps, operations, components, parts, or combinations thereof in advance. For example, a case where a portion of a layer, a layer, an area, a plate, or the like is referred to as being "on" another portion, it includes not only a case where the portion is "directly on" another portion, but also a case where there is further another portion between the portion and another portion. For example, in the disclosure, in case that a portion of a layer, a layer, an area, a plate, or the like is formed on another portion, a forming direction is not limited to an upper direction but includes forming the portion on a side surface or in a lower direction. On the contrary, in case that a portion of a layer, a layer, an area, a plate, or the like is formed "under" another portion, this includes not only a case where the portion is "directly beneath" another portion but also a case where there is further another portion between the portion and another portion.

The disclosure relates to a sensing panel and a display device including the sensing panel. Hereinafter, a sensing panel and a display device including the sensing panel according to one or more embodiments are described with reference to the accompanying drawings.

FIG. 1 is a schematic diagram illustrating a display device DD according to one or more embodiments. The display device DD may generate (or emit) light to display an image. Referring to FIG. 1, the display device DD may include a panel PNL and a driving circuit unit DV for driving the panel PNL. According to one or more embodiments, the display device DD may be a flexible display device. For example, the display device DD may be one of a rollable display device, a bendable display device, and a foldable display device. However, embodiments are not limited to the above-described example.

The panel PNL may include a display unit DP for displaying an image and a sensor unit TSP for sensing touch, pressure, biometric input (e.g., fingerprint input or fingerprint hovering), and the like. For example, the sensor unit TSP may obtain (or collect) information of a touch input of a user and may obtain (or collect) biometric input information (e.g., fingerprint input information) of the user. The sensor unit TSP may include a touch sensor and a biometric sensor (e.g., a fingerprint sensor). The sensor unit TSP may be referred to as a sensing panel. The display unit DP may be referred to as a display panel.

The panel PNL may include pixels PXL and sensing pattern layers SP. According to one or more embodiments, the pixels PXL may display an image in a display frame period unit. The sensing pattern layers SP may sense an input (for example, a touch input) of the user in a sensing frame period unit. A sensing frame period and a display frame period may be independent of each other or may be different from each other. The sensing frame period and the display frame period may be synchronized with each other or may be asynchronous.

The sensor unit TSP including the sensing pattern layers SP may obtain information of the touch input of the user. According to one or more embodiments (for example, a mutual capacitance method), the sensing pattern layers SP may include a first sensing pattern layer SP1 providing (or transmitting) a first sensing signal and a second sensing pattern layer SP2 providing (or transmitting) a second sensing signal. According to one or more embodiments, the first sensing pattern layer SP1 may be a Tx (transmitter) pattern layer, and the second sensing pattern layer SP2 may be an Rx (receiver) pattern layer. According to one or more embodiments, the information of the touch input (or a touch event) may mean information including a position or the like of a touch that the user wants to provide.

However, according to one or more embodiments (for example, a self-capacitance method), the sensing pattern layers SP may be formed of one type of sensing pattern layer without distinction between the first sensing pattern layer SP1 and the second sensing pattern layer SP2.

The driving circuit unit DV may include a display driver DDV for driving the display unit DP and a sensor driver SDV for driving the sensor unit TSP.

According to one or more embodiments, after the display unit DP and the sensor unit TSP are separately manufactured, the display unit DP and the sensor unit TSP may be disposed (or combined) so that at least one area overlap. However, according to one or more embodiments, the display unit DP and the sensor unit TSP may be manufactured to be integral with each other. For example, the sensor unit TSP may be formed (e.g., directly formed) on at least one substrate configuring the display unit DP (for example, an upper substrate and/or a lower substrate of the display unit DP, or a thin film encapsulation (TFE), refer to FIG. 5), other insulating layers, or various functional layers (for example, an optical layer or a protective layer).

In FIG. 1, the sensor unit TSP may be disposed on a front surface (for example, an upper surface on which an image is displayed) of the display unit DP, but a position of the sensor unit TSP is not limited thereto. For example, in another example, the sensor unit TSP may be disposed on a rear surface or surfaces (e.g., opposite surfaces) of the display unit DP. In another example, the sensor unit TSP may be disposed on at least one side edge area of the display unit DP.

The display unit DP may include a display substrate DSUB and pixels PXL formed on the display substrate DSUB. The pixels PXL may be disposed in a display area DA.

The display substrate DSUB (or the display device DD) may include the display area DA in which an image is displayed and a non-display area NDA outside the display area DA. According to one or more embodiments, the display area DA may be disposed in a central area of the display unit DP, and the non-display area NDA may be disposed at an edge area of the display unit DP to surround the display area DA.

The display substrate DSUB may be a rigid substrate or a flexible substrate, and a material or a property of the display substrate DSUB is not limited thereto. For example, the display substrate DSUB may be a rigid substrate formed of glass or tempered glass, or a flexible substrate formed of a thin film of a plastic or metal material.

Scan lines SL and data lines DL and the pixels PXL connected to the scan lines SL and the data lines DL may be disposed in the display area DA. The pixels PXL may be selected by a scan signal of a turn-on level supplied from the scan lines SL, receive a data signal from the data lines DL, and emit light of a luminance corresponding to the data signal. Accordingly, an image corresponding to the data signal is displayed in the display area DA. However, a structure, a driving method, and the like of the pixels PXL are not limited. For example, each of the pixels PXL may be implemented as a pixel employing various structures and driving methods.

Various lines and/or built-in circuit units connected to the pixels PXL of the display area DA may be disposed in the non-display area NDA. For example, lines for supplying various power and control signals to the display area DA may be disposed in the non-display area NDA.

The sensor unit TSP may include a base layer BSL and sensing pattern layers SP formed on the base layer BSL. The sensing pattern layers SP may be disposed in a sensing area SA on the base layer BSL.

The base layer BSL (or the display device DD) may include the sensing area SA in which a touch input or the like may be sensed, and a non-sensing area NSA outside the sensing area SA. According to one or more embodiments, the sensing area SA may overlap at least one area of the display area DA. For example, the sensing area SA may be set as an area corresponding to the display area DA (for example, an area overlapping the display area DA), and the non-sensing area NSA may be set as an area corresponding to the non-display area NDA (for example, an area overlapping the non-display area NDA). In case that the touch input or the like is provided on the display area DA, the touch input may be detected through the sensor unit TSP.

The base layer BSL may be a rigid or flexible substrate, and the base layer may be formed of at least one insulating layer. For example, the base layer BSL may be a transparent or translucent light-transmitting substrate, but embodiments are not limited thereto. For example, a material and a property of the base layer BSL are not limited thereto. For example, the base layer BSL may be a rigid substrate formed of glass or tempered glass, or a flexible substrate formed of a thin film of a plastic or metal material. For example, according to one or more embodiments, at least one substrate (for example, the display substrate DSUB, an encapsulation substrate, and/or a thin film encapsulation layer) forming the display unit DP, or at least one layer of insulating layer, functional layer, or the like disposed inside and/or outside the display unit DP may be used as the base layer BSL.

The sensing area SA may be set as an area that responds to respond to the touch input (e.g., an active area of a sensor). For example, the sensing pattern layers SP for sensing the touch input or the like may be disposed in the sensing area SA.

According to one or more embodiments, each of the first sensing pattern layers SP1 may extend in a first direction DR1. The first sensing pattern layers SP1 may be arranged in a second direction DR2. The second direction DR2 may be different from the first direction DR1. For example, the second direction DR2 may be a direction perpendicular to the first direction DR1. Each of the first sensing pattern layers SP1 may have a form in which first cell electrodes (refer to 'C1' of FIG. 8) of a relatively large area and first bridge pattern layers (refer to 'BRP1' of FIG. 8) of a relatively narrow area are connected. The first sensing pattern layers SP1 may have a diamond shape. However, a shape of the first sensing pattern layers SP1 is not limited thereto.

According to one or more embodiments, each of the second sensing pattern layers SP2 may extend in the second direction DR2. The second sensing pattern layers SP2 may be arranged in the first direction DR1. Each of the second sensing pattern layers SP2 may have a form in which second cell electrodes (refer to 'C2' of FIG. 8) of a relatively large area and second bridge pattern layers (refer to 'BRP2' of FIG. 8) of a relatively narrow area are connected. The second sensing pattern layers SP2 may have a diamond shape. However, a shape of the second sensing pattern layers SP2 is not limited thereto.

According to one or more embodiments, the first sensing pattern layers SP1 and the second sensing pattern layers SP2 may have substantially a same shape. For example, the first sensing pattern layers SP1, which are the Tx pattern layers, and the second sensing pattern layers SP2, which are the Rx pattern layers, may have substantially a same shape, and thus sensing performance of the touch event may be uniformly set in the sensing area SA.

In the non-sensing area NSA of the sensor unit TSP, sensing lines (refer to 'SL1' and 'SL2' of FIG. 3) for electrically connecting the sensing pattern layers SP to the sensor driver SDV and the like may be disposed.

The driving circuit unit DV may include the display driver DDV for driving the display unit DP and the sensor driver SDV for driving the sensor unit TSP. According to one or more embodiments, the display driver DDV and the sensor driver SDV may be formed on a driving circuit member (refer to 'DCB' of FIG. 2). However, embodiments are not limited to the above-described example.

The display driver DDV may be electrically connected to the display unit DP to drive the pixels PXL. The sensor driver SDV may be electrically connected to the sensor unit TSP to drive the sensor unit TSP.

Figure 2:
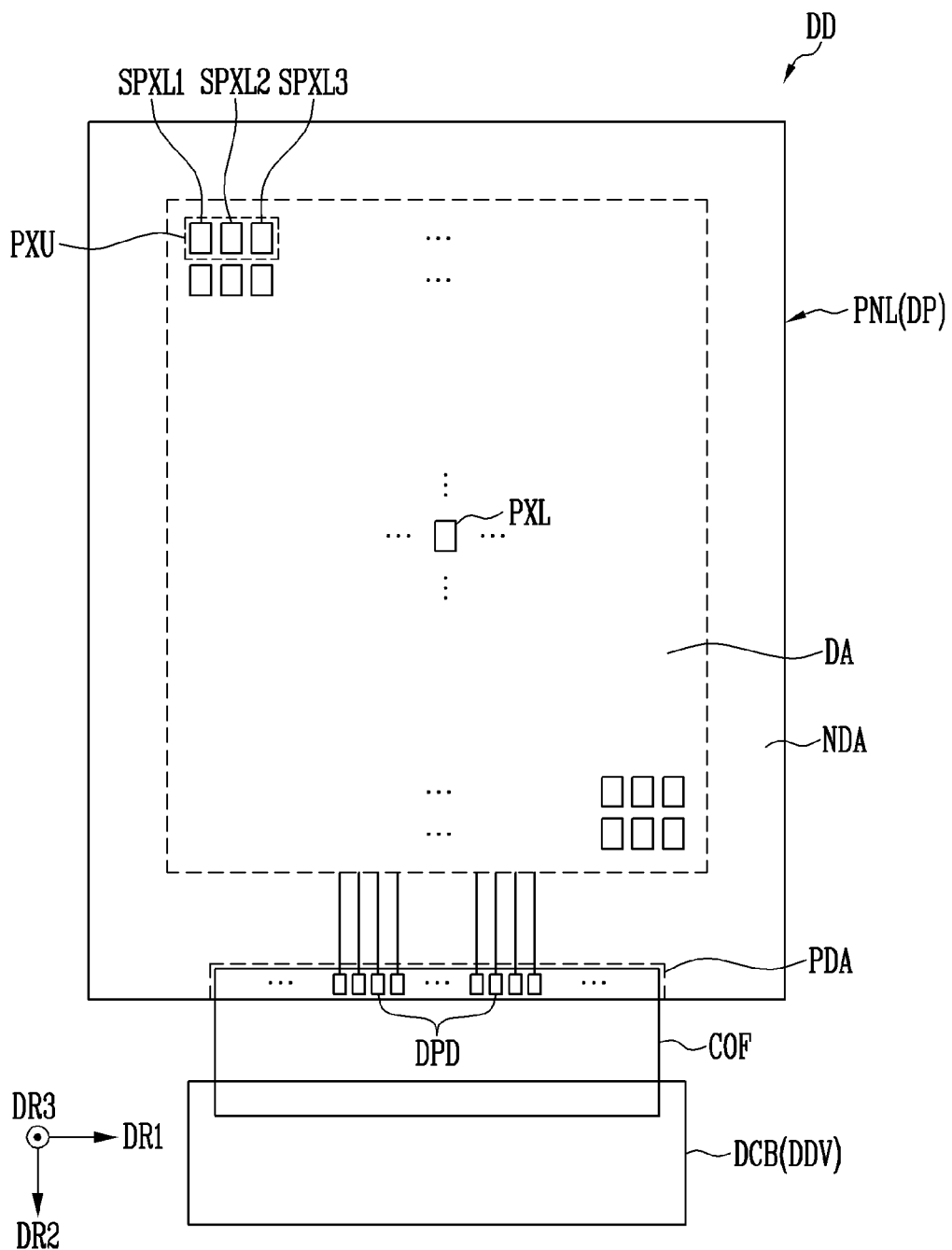
FIG. 2 is a schematic plan view of a display device according to one or more embodiments.

FIG. 2 is a schematic plan view of a display device DD according to one or more embodiments. For example, FIG. 2 may show the panel PNL based on the display unit DP of the display device DD.

Referring to FIG. 2, the pixels PXL may be arranged according to an arrangement structure in the display area DA. For example, the pixels PXL may be arranged according to a stripe or PENTILE™ arrangement structure or the like. However, embodiments are not limited to the above-described example.

The pixel PXL may include a first sub-pixel SPXL1, a second sub-pixel SPXL2, and a third sub-pixel SPXL3. At least one of the first sub-pixel SPXL1, the second sub-pixel SPXL2, and the third sub-pixel SPXL3 may form a pixel unit PXU that emits light of various colors.

For example, each of the first sub-pixel SPXL1, the second sub-pixel SPXL2, and the third sub-pixel SPXL3 may emit light of one color. For example, the first sub-pixel SPXL1 may be a red pixel emitting light of red (for example, a first color), the second sub-pixel SPXL2 may be a green pixel emitting light of green (for example, a second color), and the third sub-pixel SPXL3 may be a blue pixel emitting light of blue (for example, a third color). According to one or more embodiments, the number of the second sub-pixels SPXL2 may be greater than the number of the first sub-pixels SPXL1 and the number of the third sub-pixels SPXL3. However, the color, type, number, and/or the like of the first sub-pixel SPXL1, the second sub-pixel SPXL2, and the third sub-pixel SPXL3 forming each pixel unit PXU are/is limited to a specific example.

The panel PNL may include display pads DPD, a chip on film COF, and a driving circuit member DCB disposed in a pad area PDA.

The display pads DPD may be disposed in the pad area PDA. The pad area PDA may be disposed in the non-display area NDA. For example, the pad area PDA may be disposed on a side of the display area DA. However, embodiments are not limited to the above-described example.

The display pads DPD may be electrically connected to the pixels PXL in the display area DA through lines. The display pads DPD may be electrically connected to the display driver DDV formed in the driving circuit member DCB through the chip on film COF. For example, an electrical signal provided by the display driver DDV may be applied to the pixel PXL through the display pads DPD.

The chip on film COF may be electrically connected to the display pads DPD and the display driver DDV. For example, an end of the chip on film COF may be connected (or attached) to the pad area PDA, and another end of the chip on film COF may be connected (or attached) to the driving circuit member DCB. At least a portion of the chip on film COF may be bent.

The chip on film COF may include an insulating film and lines provided on the insulating film. The chip on film COF may be collectively referred to as an insulating film formed of a thin film and a shape in which lines are formed on the insulating film, and may be referred to as a tape carrier package, a flexible printed circuit board, or the like. In the chip on film COF, a semiconductor chip connected to at least some of the lines may be further mounted on the insulating film.

The driving circuit member DCB may include a flexible circuit board. The display driver DDV may be formed in the driving circuit member DCB. The driving circuit member DCB may be disposed on a rear surface of the display substrate DSUB of the display unit DP. An end of the driving circuit member DCB may be connected to the chip on film COF having a bent shape and may be disposed on the rear surface of the display substrate DSUB, and thus the driving circuit member DCB may not be visually recognized from the outside.

Figure 3:
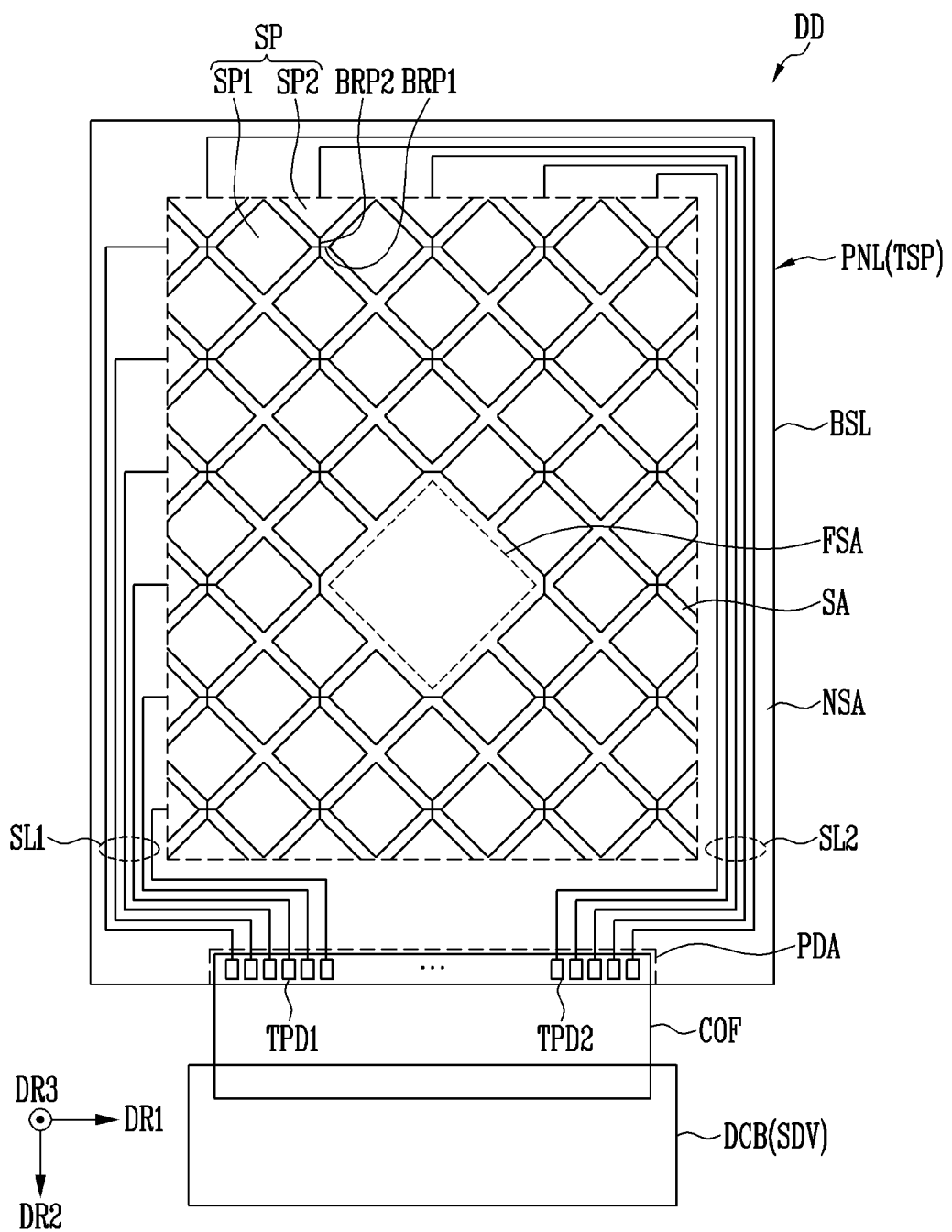
FIG. 3 is a schematic plan view of a display device according to one or more embodiments.

FIG. 3 is a schematic plan view of a display device DD according to one or more embodiments. For example, FIG. 3 may show the panel PNL based on the sensor unit TSP of the display device DD.

Referring to FIG. 3, the display device DD may include a biometric sensing area (e.g., a fingerprint sensing area FSA). The sensor unit TSP may include a biometric sensor (e.g., a fingerprint sensor) that obtains information of a fingerprint of the user. In case that a fingerprint input of the user is provided to the fingerprint sensing area FSA, the fingerprint sensor may obtain information of the provided fingerprint input.

The fingerprint sensing area FSA may be disposed in the sensing area SA. For example, the fingerprint sensing area FSA may be surrounded by the sensing area SA. According to one or more embodiments, the fingerprint sensing area FSA may be disposed inside the sensing area SA in a plan view. According to one or more embodiments, the fingerprint sensing area FSA may be spaced apart from a side of the panel PNL adjacent to the driving circuit unit DV by a certain distance. According to one or more embodiments, in conjunction with FIG. 2, the fingerprint sensing area FSA may be disposed in the display area DA. The fingerprint sensing area FSA may be surrounded by the display area DA. According to one or more embodiments, the fingerprint sensing area FSA may be disposed inside the display area DA in a plan view.

The fingerprint sensing area FSA may have a shape. For example, the fingerprint sensing area FSA may have a diamond shape. However, embodiments are not limited to the above-described example. A side of the fingerprint sensing area FSA may be parallel or perpendicular to a side of the sensing pattern layers SP. An angle between the fingerprint sensing areas FSA and an angle between the sensing pattern layers SP may be substantially same as each other.

The fingerprint sensing area FSA may not overlap the sensing pattern layers SP in a plan view. For example, conductive pattern layers (refer to 'CP1' and 'CP2' of FIG. 6) for forming biometric sensing pattern layers (e.g., fingerprint sensing pattern layers as referred to 'FP1' and 'FP2' of FIG. 7) disposed in the fingerprint sensing area FSA may be disposed on a same layer as at least a portion of the conductive pattern layers CP1 and CP2 for forming the sensing pattern layers SP. According to one or more embodiments, in case that the touch input of the user is provided to a position corresponding to the fingerprint sensing area FSA, information of the touch input at a position corresponding to the fingerprint sensing area FSA may be calculated (or collected), based on a capacitance formed between adjacent sensing pattern layers SP (for example, by applying a compensation algorithm or the like).

Details regarding a connection relationship between other configurations of the fingerprint sensing pattern layers FP1 and FP2 in the fingerprint sensing area FSA and a biometric sensing operation (e.g., a fingerprint sensing operation) of the sensor unit TSP are described below with reference to FIG. 7 and the like.

Referring to FIG. 3, the panel PNL may include first sensing lines SL1, second sensing lines SL2, and first touch sensing pads TPD1 and second touch sensing pads TPD2 disposed in the pad area PDA.

The first touch sensing pads TPD1 and the second touch sensing pads TPD2 may be disposed in the pad area PDA. According to one or more embodiments, the first touch sensing pads TPD1 and the second touch sensing pads TPD2 may be disposed on a side of the pad area PDA, respectively. However, embodiments are not limited to the above-described example.

The first touch sensing pads TPD1 may be electrically connected to the first sensing pattern layers SP1 in the sensing area SA through first sensing lines SL1. The second touch sensing pads TPD2 may be electrically connected to the second sensing pattern layers SP2 in the sensing area SA through second sensing lines SL2. The first touch sensing pads TPD1 and the second touch sensing pads TPD2 may be electrically connected to the sensor driver SDV formed in the driving circuit member DCB through the chip on film COF. For example, an electrical signal provided by the sensor driver SDV may be applied to the sensing pattern layers SP through the first touch sensing pads TPD1 and the second touch sensing pads TPD2. According to one or more embodiments, the first touch sensing pads TPD1 may be Tx pads, and the second touch sensing pads TPD2 may be Rx pads.

Figure 4:
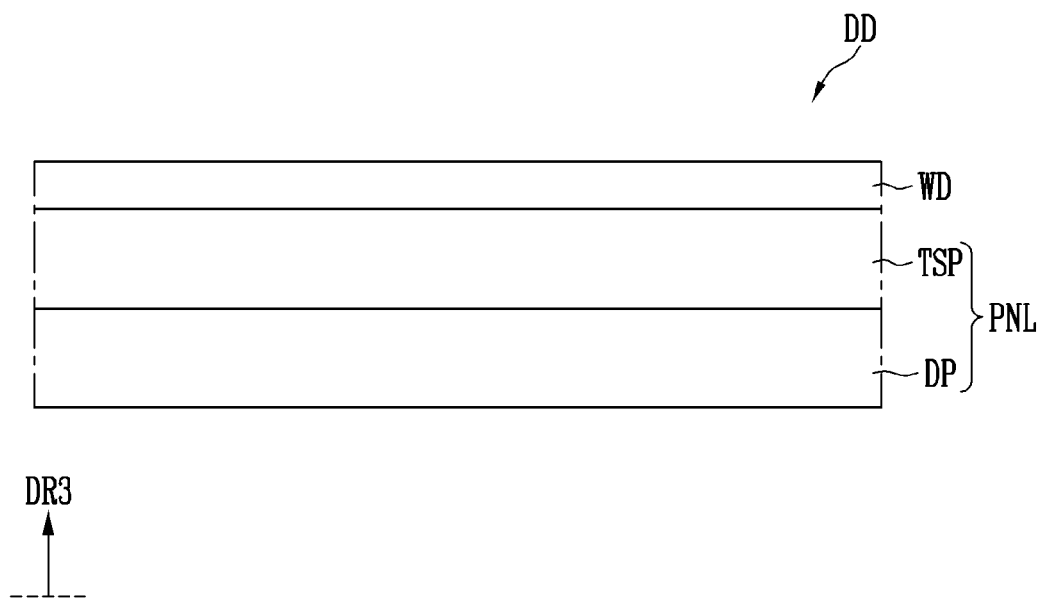
FIG. 4 is a schematic cross-sectional view illustrating a stack structure of a display device according to one or more embodiments.

FIG. 4 is a schematic cross-sectional view illustrating a stack structure of a display device DD according to one or more embodiments. Referring to FIG. 4, the sensor unit TSP may be disposed (or stacked) on the display unit DP, and a window WD may be disposed (or stacked) on the sensor unit TSP (or the panel PNL).

Referring to FIGS. 1 and 4, the display unit DP may output visual information (for example, an image). According to one or more embodiments, a type/kind of the display unit DP is not limited thereto. For example, the display unit DP may be implemented as a self-emission type display panel such as an organic light emitting display panel. However, in case that the display unit DP is implemented as a self-emission type, each pixel is not limited to a case in which only an organic light emitting element is included. For example, a light emitting element of each pixel may be formed of an organic light emitting diode, an inorganic light emitting diode, a quantum dot/well light emitting diode, or the like. In another example, the display unit DP may be implemented as a non-emission type display panel such as a liquid crystal display panel. In case that the display unit DP is implemented as a non-emission type, the display device DD may additionally include a light source such as a backlight unit.

Hereinafter, for convenience of description, embodiments are described based one or more embodiments in which the display unit DP is implemented as an organic light emitting display panel.

Referring to FIGS. 1 and 4, the sensor unit TSP may obtain information of an input provided from the user. The sensor unit TSP may recognize the touch input. The sensor unit TSP may recognize the touch input by using a capacitive sensing method. The sensor unit TSP may sense the touch input by using a mutual capacitance method or may sense the touch input using a self-capacitance method. For convenience of description, the description is provided based on one or more embodiments in which the sensor unit TSP senses the touch input using the mutual capacitance method.

According to one or more embodiments, the sensor unit TSP may obtain (or collect) information of the fingerprint of the user. For example, in case that a finger (refer to 'F' of FIG. 11) is adjacent to the display device DD (or the window WD), the fingerprint sensor of the sensor unit TSP may obtain biometric information (e.g., fingerprint information such as fingerprint shape information or the like) on the finger F of the user, based on mutual capacitance information (for example, information based on a capacitance difference changed based on a distance between the fingerprint sensing pattern layers FP1 and FP2 and a ridge 'FR' of FIG. 11 and a valley 'FV' of FIG. 11 of the finger F). According to one or more embodiments, the fingerprint sensor may include a conductive pattern structure including the fingerprint sensing pattern layers FP1 and FP2.

The window WD may be a protective member disposed on a substantially outer side of the display device DD, and may be a substantially transparent light-transmitting substrate. The window WD may have a multiple layers structure including, e.g., a glass substrate, a plastic film, and a plastic substrate. The window WD may include a rigid or flexible substrate, and the material of the window WD is not limited thereto.

For example, the display device DD may further include a polarizing plate (or another type of antireflection layer) for preventing reflection of external light between the window WD and the sensor unit TSP.

Figure 5:
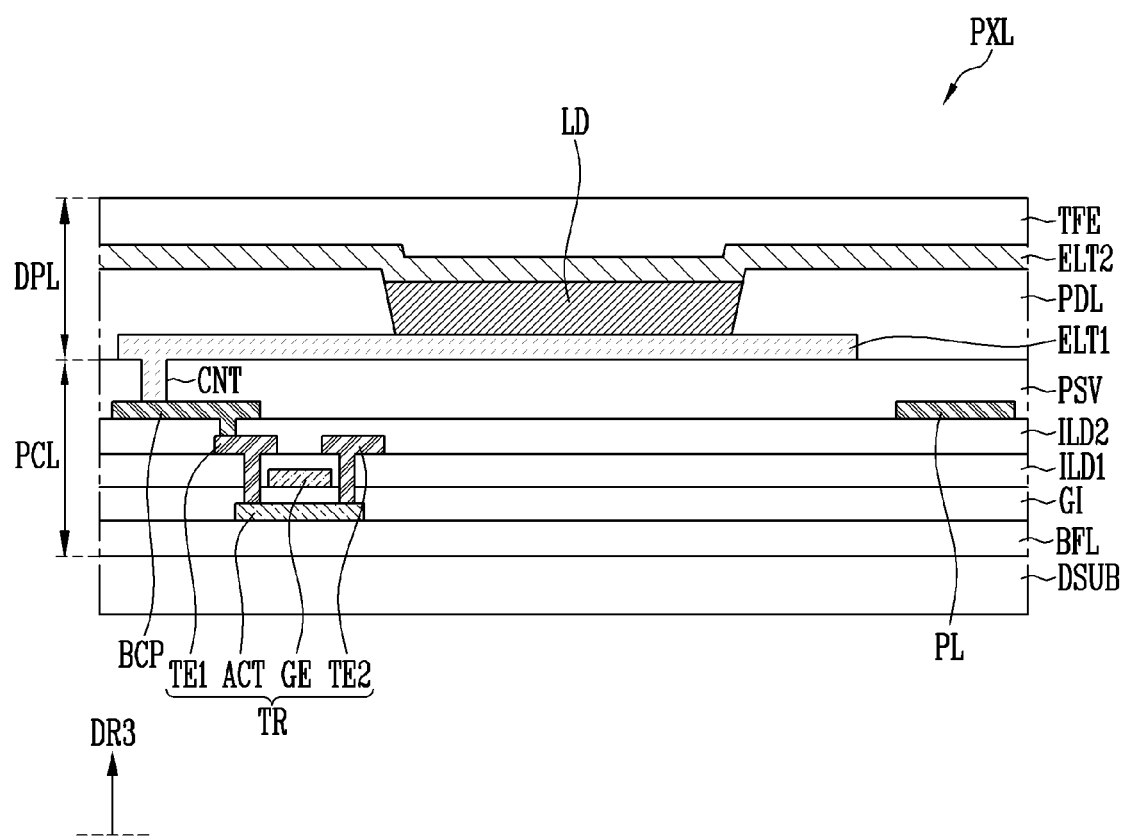
FIG. 5 is a schematic cross-sectional view illustrating a pixel according to one or more embodiments.

FIG. 5 is a schematic cross-sectional view illustrating a pixel PXL according to one or more embodiments. For example, FIG. 5 schematically illustrates a cross-sectional structure of the pixel PXL (or any one of the sub-pixels SPXL1, SPXL2, and SPXL3) as one or more embodiments in which the display unit DP is an organic light emitting display panel.

The display substrate DSUB may include an area in which a pixel circuit layer PCL and a display element layer DPL are disposed. The display substrate DSUB may form (or configure) a base member of the pixel PXL. The display substrate DSUB may be a rigid or flexible substrate or film, but embodiments are not limited thereto.

The pixel circuit layer PCL may be disposed on the display substrate DSUB. The pixel circuit layer PCL may include a buffer layer BFL, a transistor TR, a gate insulating layer GI, a first interlayer insulating layer ILD1, a second interlayer insulating layer ILD2, a connection pattern layer BCP, a power line PL, a protective layer PSV, and a contact portion CNT.

The buffer layer BFL may be disposed on the display substrate DSUB. The buffer layer BFL may prevent an impurity from diffusing from an outside. The buffer layer BFL may include at least one of a metal oxide such as silicon nitride ($SiN_x$), silicon oxide ($SiO_x$), silicon oxynitride ($SiO_xN_y$), and aluminum oxide ($Al_xO_y$).

The transistor TR may be a thin film transistor. According to one or more embodiments, the transistor TR may be a driving transistor. The transistor TR may be electrically connected to a light emitting element LD. The transistor TR may be electrically connected to the connection pattern layer BCP.

The transistor TR may include an active layer ACT, a first transistor electrode TE1, a second transistor electrode TE2, and a gate electrode GE.

The active layer ACT may refer to a semiconductor layer. The active layer ACT may be disposed on the buffer layer BFL. The active layer ACT may include at least one of polysilicon, low temperature polycrystalline silicon (LTPS), amorphous silicon, and an oxide semiconductor.

The active layer ACT may include a first contact area that is in contact with the first transistor electrode TE1, and a second contact area that is in contact with the second transistor electrode TE2. The first contact area and the second contact area may be semiconductor pattern layers doped with an impurity (e.g., a p-type dopant or an n-type dopant). An area between the first contact area and the second contact area may be a channel area. The channel area may be an intrinsic semiconductor pattern layer that is not doped with an impurity.

The gate electrode GE may be disposed on the gate insulating layer GI. A position of the gate electrode GE may correspond to a position of the channel area of the active layer ACT. For example, the gate electrode GE may be disposed on the channel area of the active layer ACT with the gate insulating layer GI interposed therebetween.

The gate insulating layer GI may be disposed on the active layer ACT. The gate insulating layer GI may include an inorganic material. According to an example, the gate insulating layer GI may include at least one of silicon nitride ($SiN_x$), silicon oxide ($SiO_x$), silicon oxynitride ($SiO_xN_y$), and aluminum oxide ($Al_xO_y$).

The first interlayer insulating layer ILD1 may be disposed on the gate electrode GE. For example, the first interlayer insulating layer ILD1 may include at least one of silicon nitride ($SiN_x$), silicon oxide ($SiO_x$), silicon oxynitride ($SiO_xN_y$), and aluminum oxide ($Al_xO_y$).

The first transistor electrode TE1 and the second transistor electrode TE2 may be positioned on the first interlayer insulating layer ILD1. The first transistor electrode TE1 may pass through the gate insulating layer GI and the first interlayer insulating layer ILD1 to be in contact with the first contact area of the active layer ACT. The second transistor electrode TE2 may pass through the gate insulating layer GI and the first interlayer insulating layer ILD1 to be in contact with the second contact area of the active layer ACT. According to an example, the first transistor electrode TE1 may be a drain electrode, and the second transistor electrode TE2 may be a source electrode, but embodiments are not limited thereto.

The second interlayer insulating layer ILD2 may be disposed on the first transistor electrode TE1 and the second transistor electrode TE2. For example, the second interlayer insulating layer ILD2 may include an inorganic material. The inorganic material may include at least one of materials of the first interlayer insulating layer ILD1 and the gate insulating layer GI, for example, silicon nitride ($SiN_x$), silicon oxide ($SiO_x$), silicon oxynitride ($SiO_xN_y$), and aluminum oxide ($Al_xO_y$).

The connection pattern layer BCP may be disposed on the second interlayer insulating layer ILD2. The connection pattern layer BCP may be connected to the first transistor electrode TE1 through a contact hole passing through the second interlayer insulating layer ILD2. The connection pattern layer BCP may be connected (e.g., electrically connected) to a first electrode ELT1 through the contact portion CNT formed in the protective layer PSV.

The power line PL may be disposed on the second interlayer insulating layer ILD2. The power line PL may be connected (e.g., electrically connected) to a second electrode ELT2 through another contact portion formed in the protective layer PSV.

The protective layer PSV may be disposed on the second interlayer insulating layer ILD2. The protective layer PSV may cover the connection pattern layer BCP and the power line PL. The protective layer PSV may include an organic insulating layer, an inorganic insulating layer, or the organic insulating layer disposed on the inorganic insulating layer, but embodiments are not limited thereto. According to one or more embodiments, the contact portion CNT connected to one area of the connection pattern layer BCP and another contact portion connected to one area of the power line PL may be formed in the protective layer PSV.

The display element layer DPL may be disposed on the pixel circuit layer PCL. The display element layer DPL may include a first electrode ELT1, a light emitting element LD, a pixel defining layer PDL, a second electrode ELT2, and a thin film encapsulation layer TFE.

According to one or more embodiments, the light emitting element LD may be disposed in an area defined by the pixel defining layer PDL. A surface of the light emitting element LD may be connected to the first electrode ELT1, and another surface of the light emitting element LD may be connected to the second electrode ELT2.

For example, the first electrode ELT1 may be an anode electrode for the light emitting element LD, and the second electrode ELT2 may be a common electrode (or a cathode electrode) for the light emitting element LD. According to one or more embodiments, the first electrode ELT1 and the second electrode ELT2 may include a conductive material. For example, the first electrode ELT1 may include a conductive material having a reflective property, and the second electrode ELT2 may include a transparent conductive material, but embodiments are not limited thereto.

According to one or more embodiments, the light emitting element LD may have a multilayer thin film structure including a light generation layer. The light emitting element LD may include a hole injection layer for injecting a hole, a hole transport layer having an excellent hole transport property and for increasing a chance of recombination of a hole and an electron by suppressing a movement of an electron that is not combined in the light generation layer, the light generation layer for emitting light by the recombination of the injected electron and hole, a hole blocking layer for suppressing a movement of a hole that is not combined in the light generation layer, an electron transport layer for smoothly transporting the electron to the light generation layer, and an electron injection layer for injecting the electron. The light emitting element LD may emit light based on an electrical signal provided from the first electrode ELT1 and the second electrode ELT2.

The pixel defining layer PDL may define a position where the light emitting element LD implemented as an organic light emitting diode is arranged. The pixel defining layer PDL may include an organic material. According to an example, the pixel defining layer PDL may include at least one of an acrylic resin, an epoxy resin, a phenolic resin, a polyamide resin, and a polyimide resin, but embodiments are not limited thereto.

The thin film encapsulation layer TFE may be disposed on the second electrode ELT2. The thin film encapsulation layer TFE may compensate a step difference generated by the light emitting element LD and the pixel defining layer PDL. The thin film encapsulation layer TFE may include insulating layers covering the light emitting element LD. According to an example, the thin film encapsulation layer TFE may have a structure in which an inorganic layer and an organic layer are alternately stacked.

Hereinafter, the sensor unit TSP according to one or more embodiments is described with reference to FIGS. 6 to 18. Redundant descriptions above are simplified or are omitted for descriptive convenience.

Figure 6:
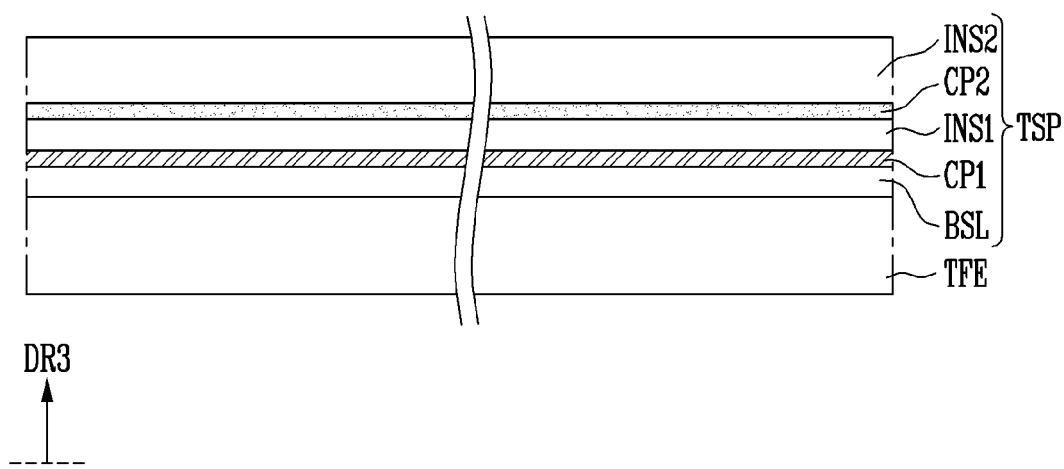
FIG. 6 is a schematic cross-sectional view illustrating a sensor unit according to one or more embodiments.

FIG. 6 is a schematic cross-sectional view illustrating a sensor unit TSP according to one or more embodiments. Referring to FIG. 6, the sensor unit TSP may be disposed on the thin film encapsulation layer TFE of the display unit DP. The sensor unit TSP may include a base layer BSL, a first conductive pattern layer CP1, a first insulating layer INS1, a second conductive pattern layer CP2, and a second insulating layer INS2.

Figure 7:
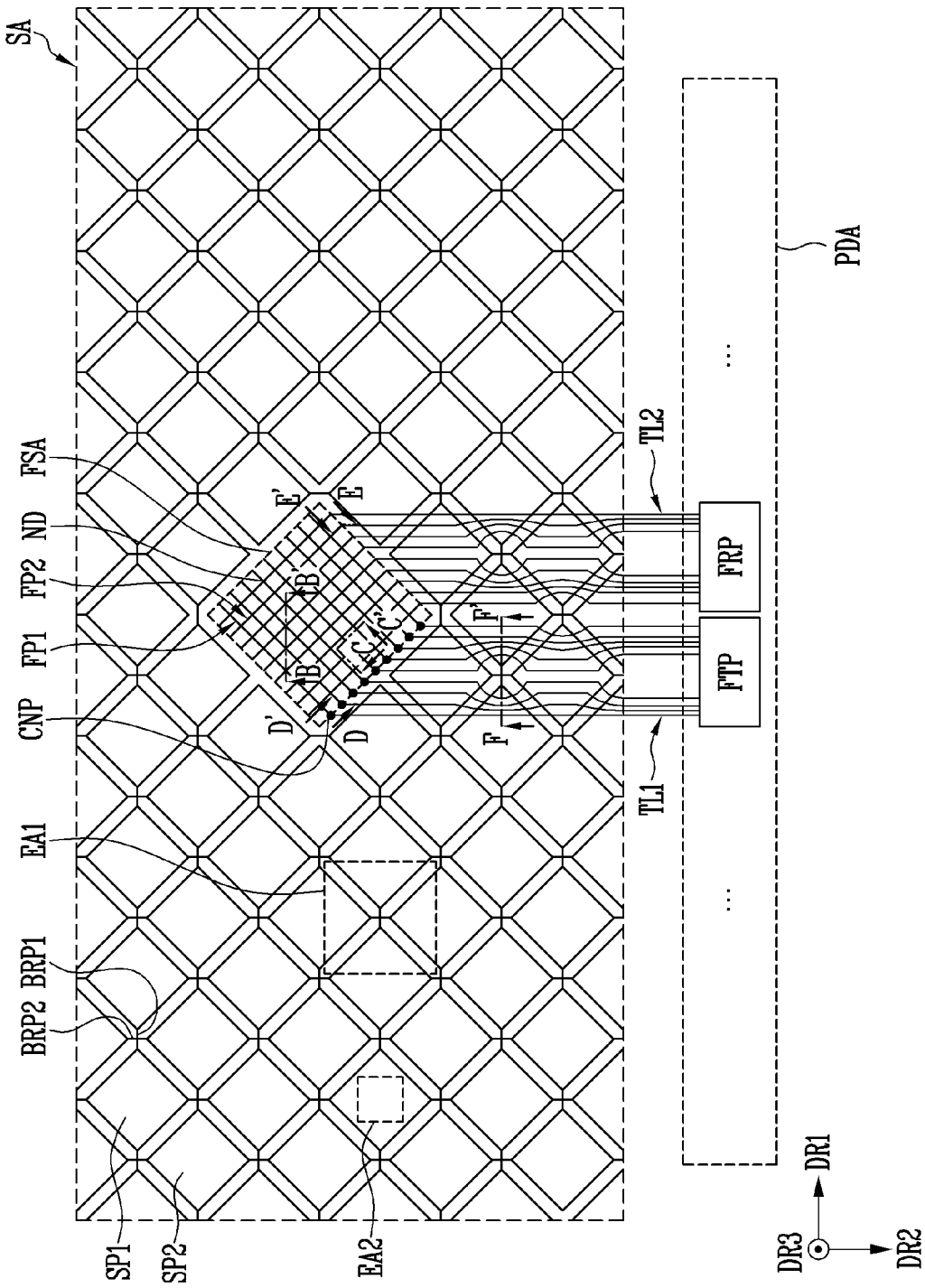
FIG. 7 is a schematic plan view illustrating a sensor unit according to one or more embodiments.

According to one or more embodiments, the first conductive pattern layer CP1 and the second conductive pattern layer CP2 may be patterned at a position to form the sensing pattern layers SP, the fingerprint sensing pattern layers FP1 and FP2, and trace lines (refer to 'TL1' and 'TL2' of FIG. 7). According to one or more embodiments, in case that the sensing pattern layers SP, the fingerprint sensing pattern layers FP1 and FP2, and the trace lines TL1 and TL2 are included in the first conductive pattern layer CP1, the sensing pattern layers SP, the fingerprint sensing pattern layers FP1 and FP2, and the trace lines TL1 and TL2 may be disposed on a first layer. In another example, in case that the sensing pattern layers SP, the fingerprint sensing pattern layers FP1 and FP2, and the trace lines TL1 and TL2 are included in the second conductive pattern layer CP2, the sensing pattern layers SP, the fingerprint sensing pattern layers FP1 and FP2, and the trace lines TL1 and TL2 may be disposed on a second layer.

The base layer BSL may be disposed on the thin film encapsulation layer TFE. The base layer BSL may include an area in which the first conductive pattern layer CP1, the first insulating layer INS1, the second conductive pattern layer CP2, and the second insulating layer INS2 are disposed. In another example, the base layer BSL may be omitted. For example, the first conductive pattern layer CP1 may be disposed on the thin film encapsulation layer TFE.

The first conductive pattern layer CP1 may be disposed on the base layer BSL. The second conductive pattern layer CP2 may be disposed on the first insulating layer INS1. The first conductive pattern layer CP1 and the second conductive pattern layer CP2 may be spaced apart from each other with the first insulating layer INS1 interposed therebetween. For convenience of description, pattern layers included in the first conductive pattern layer CP1 in cross-sectional views among the accompanying drawings may be illustrated identically to a hatching of the first conductive pattern layer CP1 of FIG. 6, and pattern layers included in the second conductive pattern layer CP2 may be illustrated identically to a hatching of the second conductive pattern layer CP2 of FIG. 6.

The first conductive pattern layer CP1 and the second conductive pattern layer CP2 may include a metal layer of a single layer or multiple layers. The first conductive pattern layer CP1 and the second conductive pattern layer CP2 may include at least one of various metal materials including gold (Au), silver (Ag), aluminum (Al), molybdenum (Mo), chromium (Cr), titanium (Ti), nickel (Ni), neodymium (Nd), copper (Cu), platinum (Pt), or an alloy thereof. According to one or more embodiments, the first conductive pattern layer CP1 and the second conductive pattern layer CP2 may include at least one of various transparent conductive materials including one of a silver nanowire (AgNW), indium tin oxide (ITO), indium zinc oxide (IZO), indium gallium zinc oxide (IGZO), antimony zinc oxide (AZO), indium tin zinc oxide (ITZO), zinc oxide (ZnO), tin oxide ($SnO_2$), carbon nano tube, and graphene.

The first insulating layer INS1 may be disposed on the first conductive pattern layer CP1. The first insulating layer INS1 may be interposed between the first conductive pattern layer CP1 and the second conductive pattern layer CP2. The second insulating layer INS2 may be disposed on the second conductive pattern layer CP2.

Each of the first insulating layer INS1 and the second insulating layer INS2 may include an inorganic material or an organic material. According to an example, the inorganic material may include silicon nitride ($SiN_x$), silicon oxide ($SiO_x$), silicon oxynitride ($SiO_xN_y$), aluminum oxide ($Al_xO_y$), and the like. The organic material may include at least one of acrylic-based resin, methacrylic-based resin, polyisoprene, vinyl-based resin, epoxy-based resin, urethane-based resin, cellulose-based resin, siloxane-based resin, polyimide-based resin, polyamide-based resin, and perylene-based resin.

FIG. 7 is a schematic plan view illustrating a sensor unit TSP according to one or more embodiments. FIG. 7 shows the sensing pattern layers SP for forming the touch sensor of the sensor unit TSP and the fingerprint sensing pattern layers FP1 and FP2 for forming the fingerprint sensor of the sensor unit TSP. Since the first sensing lines SL1, the second sensing lines SL2, the first touch sensing pads TPD1, and the second touch sensing pads TPD2 electrically connected to the sensing pattern layers SP are described above, the description thereof will be omitted for descriptive convenience.

Figure 8:
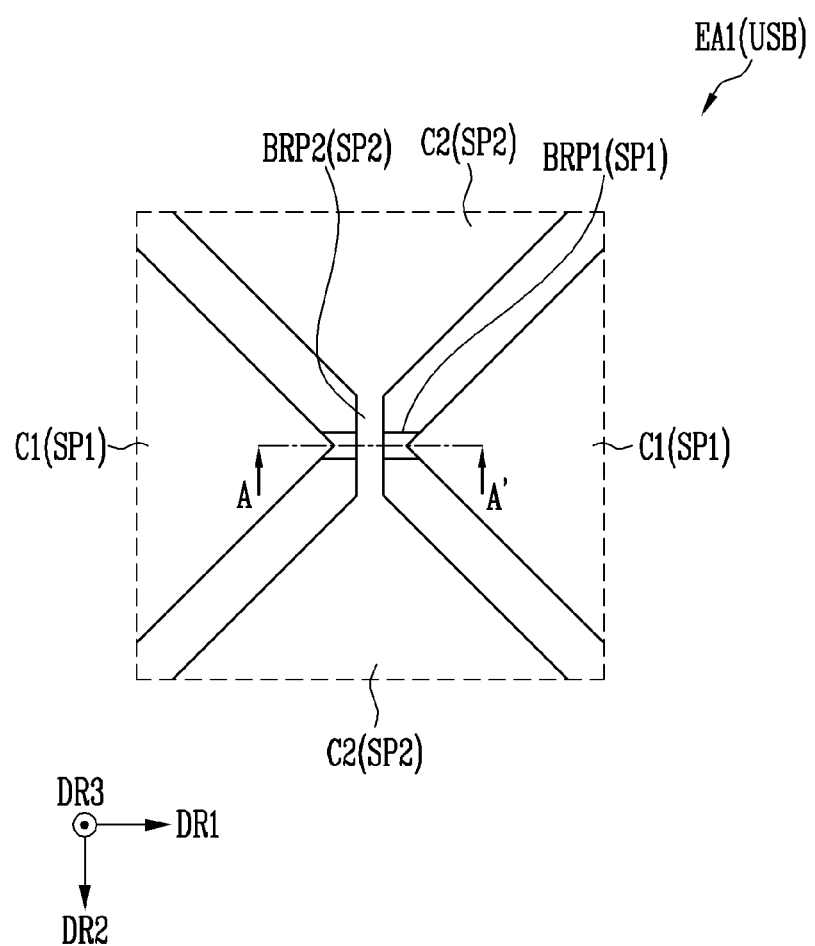
FIG. 8 is a schematic enlarged view of an area EA1 of FIG. 7.
Figure 9:
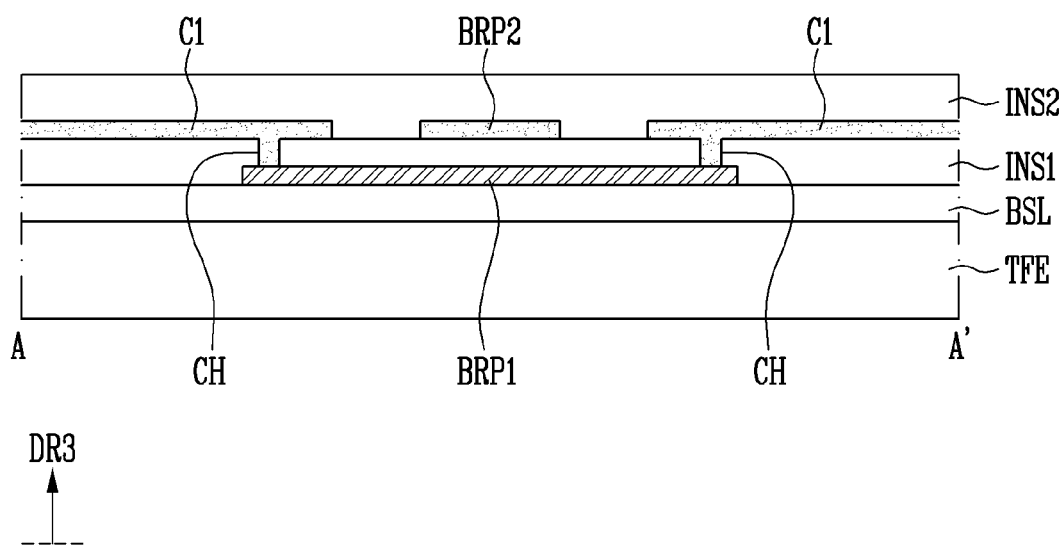
FIG. 9 is a schematic cross-sectional view taken along line A-A' of FIG. 8.
Figure 10:
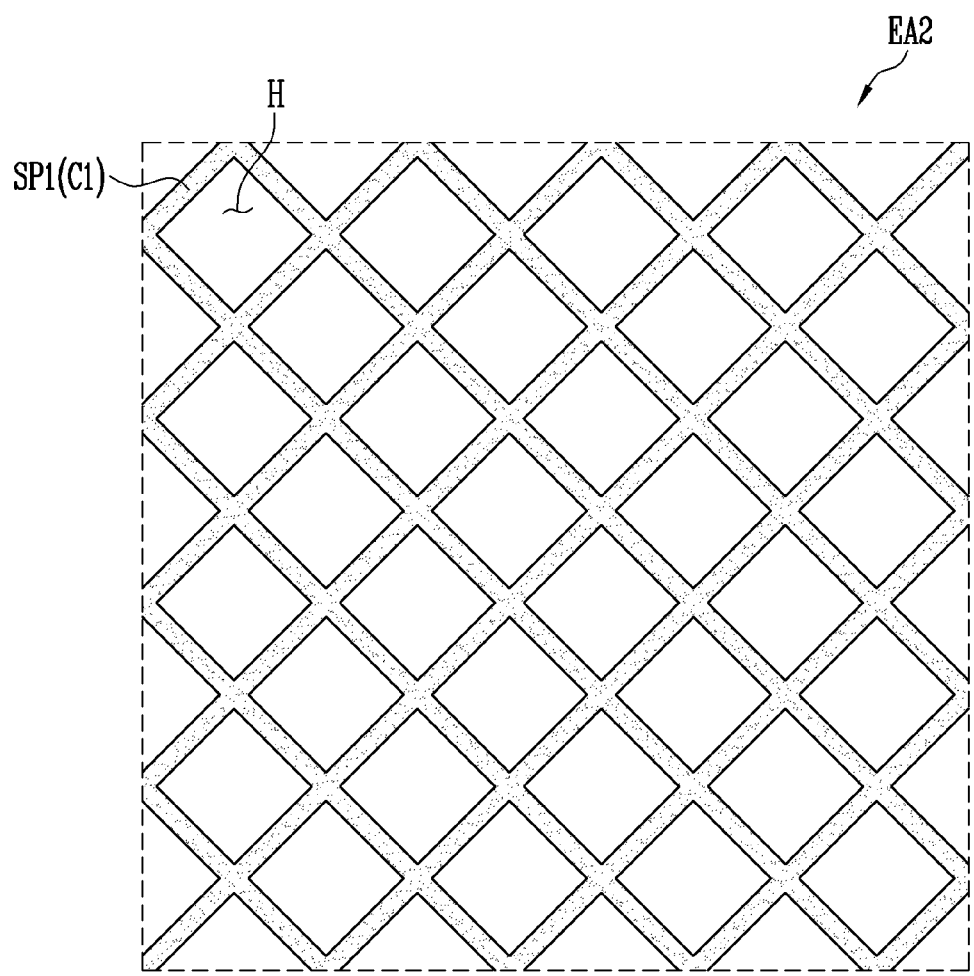
FIG. 10 is a schematic enlarged view of an area EA2 of FIG. 7.

The touch sensor of the sensor unit TSP for sensing the touch input of the user is described with reference to FIGS. 7 to 10. FIG. 8 is a schematic enlarged view of an area EA1 of FIG. 7. FIG. 9 is a schematic cross-sectional view taken along line A-A' of FIG. 8. FIG. 10 is a schematic enlarged view of an area EA2 of FIG. 7.

Referring to FIGS. 7 to 9, the first sensing pattern layers SP1 may include first cell electrodes C1 and first bridge pattern layers BRP1. The first bridge pattern layers BRP1 may connect (e.g., electrically connect) the first cell electrodes C1 adjacent to each other. The first cell electrodes C1 and the first bridge pattern layers BRP1 may be disposed on different layers. The first cell electrodes C1 and the first bridge pattern layers BRP1 disposed on different layers may be connected (e.g., electrically connected) to each other through a contact hole CH passing through the first insulating layer INS1. The first cell electrodes C1 may be included in the second conductive pattern layer CP2. The first bridge pattern layers BRP1 may be included in the first conductive pattern layer CP1.

The second sensing pattern layers SP2 may include second cell electrodes C2 and second bridge pattern layers BRP2. The second bridge pattern layers BRP2 may connect (e.g., electrically connect) the second cell electrodes C2 adjacent to each other. The second cell electrodes C2 and the second bridge pattern layers BRP2 may be disposed on a same layer. The second cell electrodes C2 and the second bridge pattern layers BRP2 may be included in the second conductive pattern layer CP2.

According to one or more embodiments, the first cell electrodes C1, the second cell electrodes C2, and the second bridge pattern layers BRP2 may be disposed on a same layer. The first bridge pattern layer BRP1 may be disposed on the first insulating layer INS1, and the first cell electrodes C1, the second cell electrodes C2, and the second bridge pattern layers BRP2 may be disposed on the base layer BSL. For example, the first bridge pattern layer BRP1 may be disposed at a level different from (e.g., lower than) levels of the first cell electrodes C1, the second cell electrodes C2, and the second bridge pattern layers BRP2. The first bridge pattern layer BRP1 among the first sensing pattern layers SP1 and the second sensing pattern layers SP2 may be disposed on a lower layer than other pattern layers.

The sensor unit TSP may have a repetitive arrangement structure of a unit member block USB. The unit member block USB may be a virtual unit block having one area including a portion of the first sensing pattern layers SP1 and a portion of the second sensing pattern layers SP2. The unit sensor member USB may be a minimum repetitive unit of an arrangement pattern layer of the first sensing pattern layers SP1 and the second sensing pattern layers SP2.

Referring to FIG. 10, the first sensing pattern layer SP1 may have a mesh structure (or a mesh pattern). For example, the first sensing pattern layer SP1 may have a conductive pattern layer structure, which is formed of a conductive material and includes holes H. As described above, the first sensing pattern layer SP1 may be included in the second conductive pattern layer CP2, and the second conductive pattern layer CP2 disposed on the first insulating layer INS1 may be patterned in a mesh structure to form the first sensing pattern layer SP1. According to one or more embodiments, positions of the holes H may correspond to a position of the sub-pixels SPXL1, SPXL2, and SPXL3 disposed in the display unit DP. Thus, light emission efficiency of the pixel PXL may not be substantially reduced. For example, the second sensing pattern layer SP2 may also have a mesh structure similar to the mesh structure of the first sensing pattern layer SP1. As described above, the second sensing pattern layer SP2 may be included in the second conductive pattern layer CP2 and may have a mesh structure including the holes H.

The fingerprint sensing sensor of the sensor unit TSP for obtaining the fingerprint information of the user is described with reference to FIGS. 7 and 11 to 18.

Figure 11:
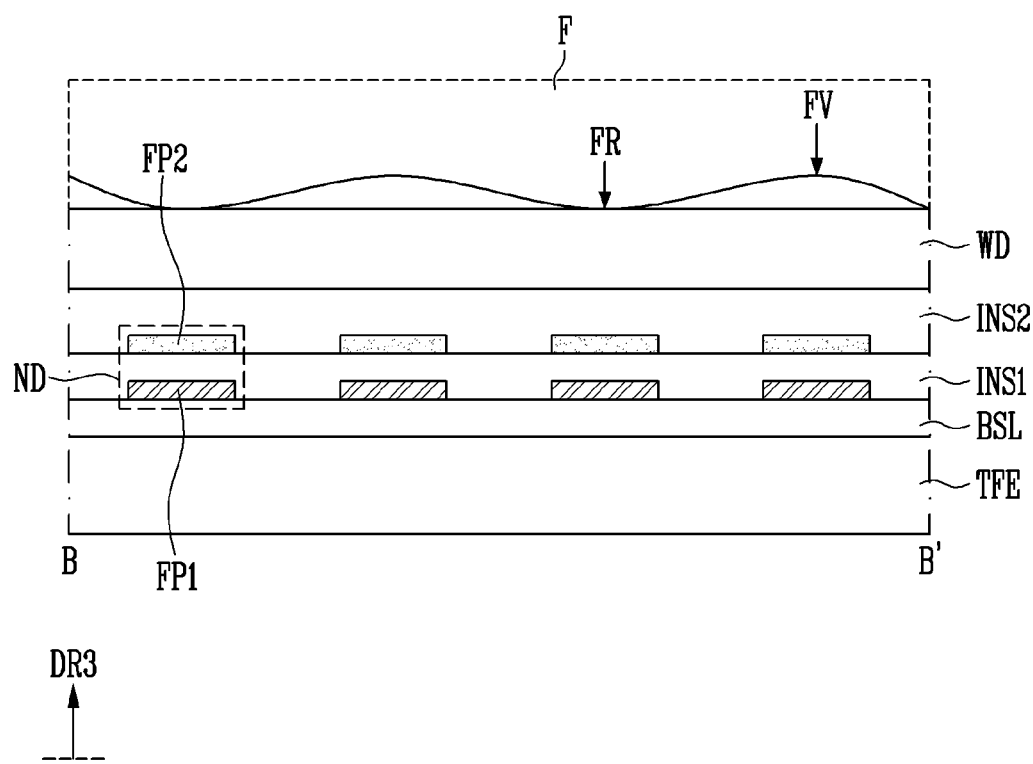
FIG. 11 is a schematic cross-sectional view taken along line B-B' of FIG. 7.
Figure 12:
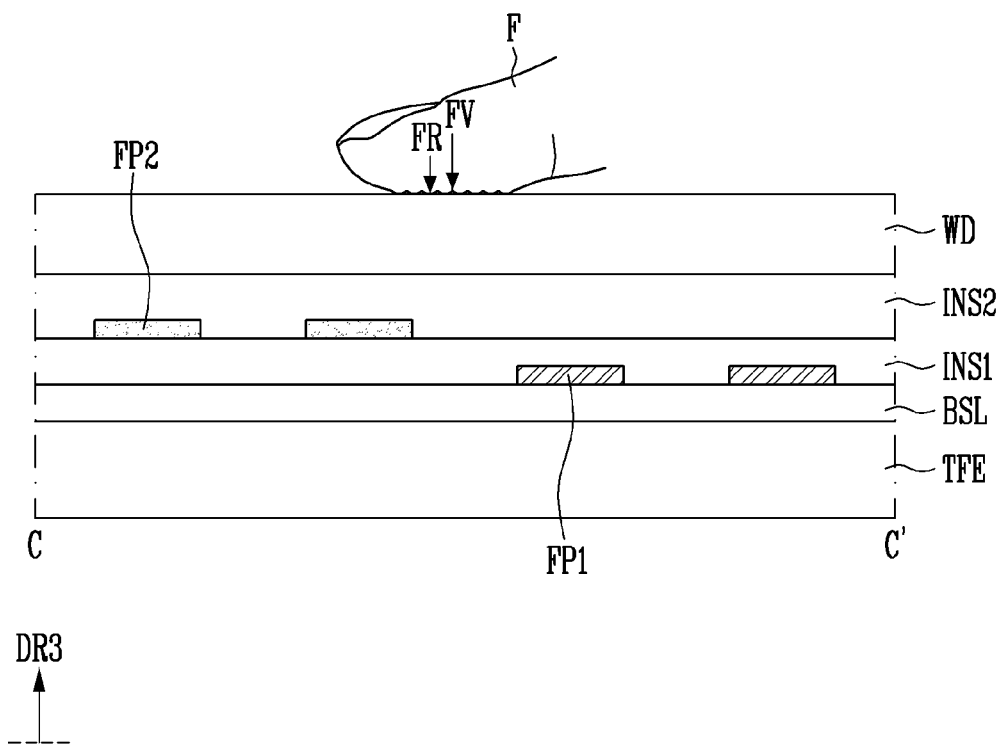
FIG. 12 is a schematic cross-sectional view taken along line C-C' of FIG. 7.
Figure 13:
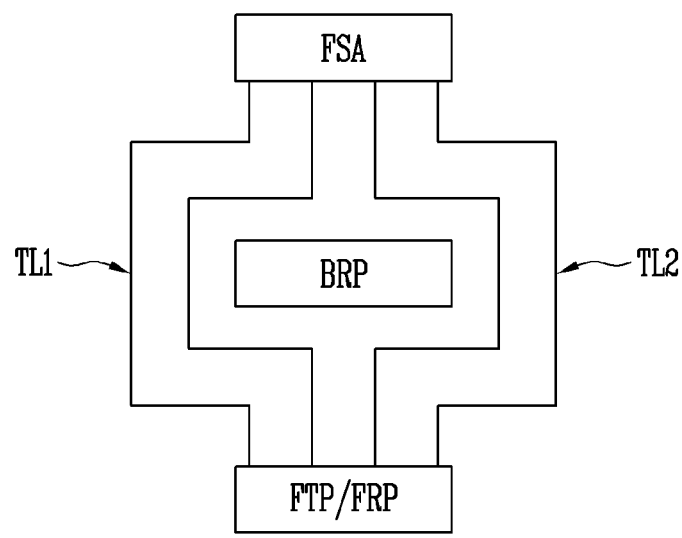
FIG. 13 is a schematic plan view illustrating a bypass structure of a trace line according to one or more embodiments.
Figure 14:
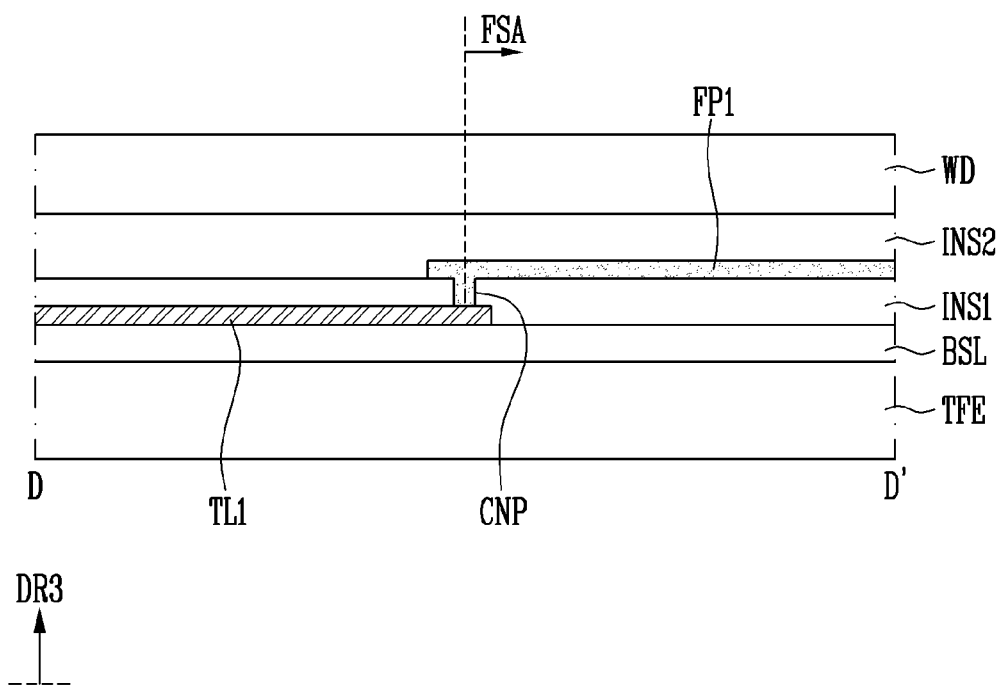
FIG. 14 is a schematic cross-sectional view taken along line D-D' of FIG. 7.
Figure 15:
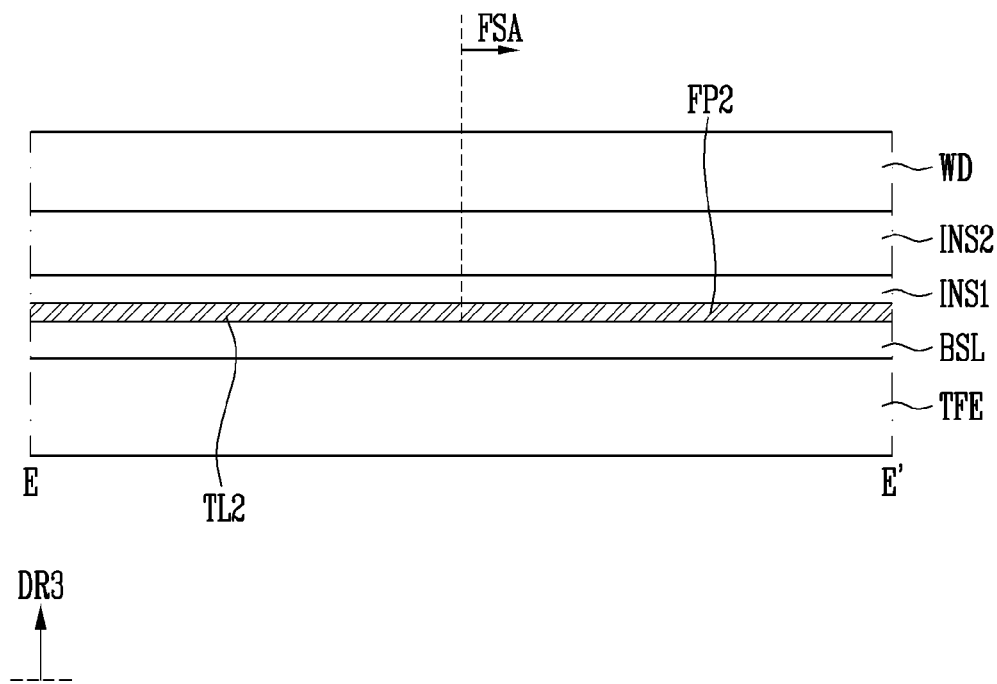
FIG. 15 is a schematic cross-sectional view taken along line E-E' of FIG. 7.
Figure 16:
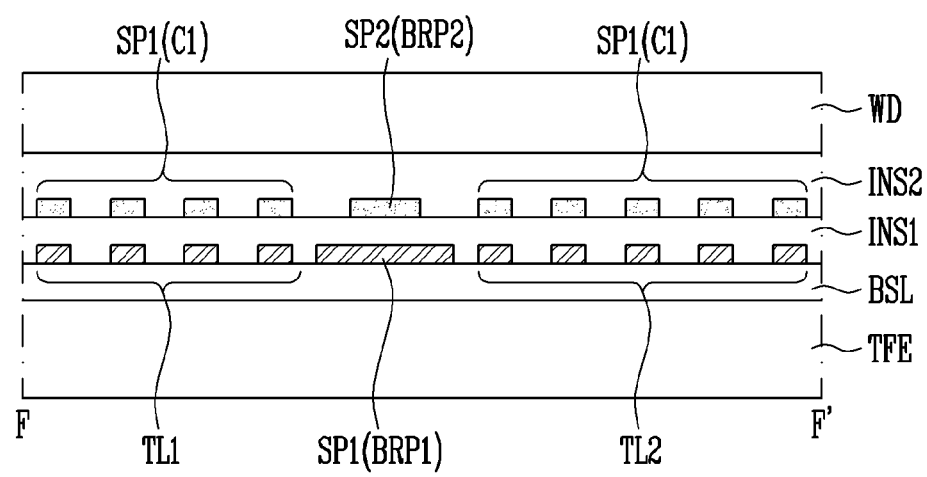
FIG. 16 is a schematic cross-sectional view taken along line F-F' of FIG. 7.

FIG. 11 is a schematic cross-sectional view taken along line B-B' of FIG. 7. FIG. 12 is a schematic cross-sectional view taken along line C-C' of FIG. 7. FIG. 13 is a schematic plan view illustrating a bypass structure of a trace line according to one or more embodiments. FIG. 14 is a schematic cross-sectional view taken along line D-D' of FIG. 7. FIG. 15 is a schematic cross-sectional view taken along line E-E' of FIG. 7. FIG. 16 is a schematic cross-sectional view taken along line F-F' of FIG. 7.

Referring to FIGS. 7, 11, and 12, the fingerprint sensing pattern layers FP1 and FP2 may be disposed in the fingerprint sensing area FSA. For example, the fingerprint sensing pattern layers FP1 and FP2 may be disposed adjacent to the sensing pattern layers SP. The fingerprint sensing pattern layers FP1 and FP2 may be disposed as a pattern layer in the fingerprint sensing area FSA. The fingerprint sensing area FSA may be an area in which the fingerprint sensing pattern layers FP1 and FP2 are disposed.

The fingerprint sensing pattern layers FP1 and FP2 may obtain fingerprint information based on a shape of the ridge FR and the valley FV of the finger F of the user in case that the finger F of the user is touched or approached on the panel PNL (or the window WD). The first fingerprint sensing pattern layers FP1 may be Tx fingerprint sensing pattern layers, and the second fingerprint sensing pattern layers FP2 may be Rx fingerprint sensing pattern layers. In case that the finger F is adjacent to the panel PNL (or the window WD), due to the shape of the ridge FR and the valley FV of the finger F, distances between the first fingerprint sensing pattern layer FP1 and the second fingerprint sensing pattern layer FP2 and the ridge FR and the valley FV may be different. For example, a first distance between the ridge FR of the finger F and the first and second fingerprint sensing pattern layers FP1 and FP2 may be smaller than a second distance between the valley FV of the finger F and the first and second fingerprint sensing pattern layers FP1 and FP2. For example, the difference between the first distance and the second distance may cause capacitance differences between the first and second fingerprint sensing pattern layers FP1 and FP2. Based on the capacitance difference occurred in the first fingerprint sensing pattern layer FP1 and the second fingerprint sensing pattern layer FP2 according to the shape of the fingerprint of the finger F, the fingerprint sensor may obtain (or calculate) information of a fingerprint shape of the finger F of the user based on the capacitance difference.

For example, FIG. 11 may be a schematic cross-sectional view of sensing nodes ND where the first fingerprint sensing pattern layer FP1 and the second fingerprint sensing pattern layer FP2 intersect (or overlap) each other in a plan view. In case that the finger F is adjacent, the first fingerprint sensing pattern layer FP1 and the second fingerprint sensing pattern layer FP2 may have different capacitances at positions of each of the sensing nodes ND, and thus an electrical signal corresponding to the fingerprint shape information of the finger F may be obtained. According to one or more embodiments, the sensing nodes ND may refer to positions where the first fingerprint sensing pattern layers FP1 and the second fingerprint sensing pattern layers FP2 overlap each other in a plan view.

According to one or more embodiments, each of the first fingerprint sensing pattern layer FP1 and the second fingerprint sensing pattern layer FP2 may have a structure extending in a direction. According to one or more embodiments, the first fingerprint sensing pattern layers FP1 may extend in a first extension direction (refer to 'EDR1' of FIG. 17) and may be sequentially arranged in a direction (for example, a second extension direction (refer to 'EDR2' of FIG. 17)). The second fingerprint sensing pattern layers FP2 may extend in the second extension direction EDR2 and may be sequentially arranged in a direction (for example, the first extension direction EDR1). The first extension direction EDR1 and the second extension direction EDR2 may be different from each other. According to one or more embodiments, the first extension direction EDR1 may be parallel to a side of the cell electrodes C1 and C2 of the sensing pattern layers SP, and the second extension direction EDR2 may be parallel to another side of the cell electrodes C1 and C2 of the sensing pattern layers SP. Accordingly, the first fingerprint sensing pattern layer FP1 and the second fingerprint sensing pattern layer FP2 may form sensing nodes ND overlapping at a plurality of positions. According to one or more embodiments, the first fingerprint sensing pattern layers FP1 and the second fingerprint sensing pattern layers FP2 may overlap at a plurality of positions, the sensing nodes ND may be arranged in a matrix form, and as described above, the fingerprint information of the finger F of the user may be defined at the position of the sensing nodes ND.

The first fingerprint sensing pattern layer FP1 and the second fingerprint sensing pattern layer FP2 may be disposed on different layers. For example, the first fingerprint sensing pattern layer FP1 may be more adjacent (or closer) to the base layer BSL (or the display unit DP) than the second fingerprint sensing pattern layer FP2. The first fingerprint sensing pattern layer FP1 may be included in the first conductive pattern layer CP1 and may be disposed on a first layer (e.g., the base layer BSL). The second fingerprint sensing pattern layer FP2 may be included in the second conductive pattern layer CP2 and may be disposed on a second layer (e.g., the first insulating layer INS1).

Referring to FIGS. 14 and 15, according to one or more embodiments, the fingerprint sensing pattern layers FP1 and FP2 may be connected (e.g., electrically connected) to the trace lines TL1 and TL2. For example, the first fingerprint sensing pattern layer FP1 may be connected (e.g., electrically connected) to a first trace line TL1 through a contact member CNP. The contact member CNP may pass through the first insulating layer INS1. The second fingerprint sensing pattern layer FP2 may be connected (e.g., electrically connected) to a second trace line TL2. According to one or more embodiments, at least a portion of the trace lines TL1 and TL2 may be disposed in the sensing area SA.

According to one or more embodiments, the display device DD may include fingerprint sensing pads FTP and FRP. The fingerprint sensing pads FTP and FRP may be disposed in an area outside the sensing area SA. The fingerprint sensing pads FTP and FRP may be disposed in the pad area PDA. According to one or more embodiments, the first fingerprint sensing pads FTP and the second fingerprint sensing pads FRP may be disposed in a substantially central area of the pad area PDA. However, embodiments are not limited to the above-described example.

The first fingerprint sensing pads FTP may be connected (e.g., electrically connected) to the first fingerprint sensing pattern layer FP1 through the first trace lines TL1. The second fingerprint sensing pads FRP may be connected (e.g., electrically connected) to the second fingerprint sensing pattern layer FP2 through the second trace lines TL2. For example, the first fingerprint sensing pads FTP and the second fingerprint sensing pads FRP may be connected (e.g., electrically connected) to the sensor driver SDV formed in the driving circuit member DCB through the chip on film COF. For example, an electrical signal provided by the sensor driver SDV may be applied to the first fingerprint sensing pads FTP and the second fingerprint sensing pads FRP. According to one or more embodiments, the first fingerprint sensing pads FTP may be Tx pads, and the second fingerprint sensing pads FRP may be Rx pads.

According to one or more embodiments, the sensor driver SDV may process the fingerprint information of the user obtained by the fingerprint sensor, and may process touch event information of the user obtained by the touch sensor.

According to one or more embodiments, an integrated chip (IC) for the fingerprint sensor and an IC for the touch sensor may be a same configuration. According to one or more embodiments, in case that the display device DD (or the sensor unit TSP) operates in the fingerprint sensing mode for obtaining the fingerprint information of the user in the fingerprint sensing area FSA, the sensor driver SDV may process the fingerprint information of the user. In case that the display device DD (or the sensor unit TSP) operates in the touch sensing mode for obtaining the touch information of the user in the sensing area SA, the sensor driver SDV may process the touch event information of the user. According to one or more embodiments, in case that the touch event of the user occurs in the fingerprint sensing area FSA and the display device DD (or the sensor unit TSP) operates in the touch sensing mode, the sensor driver SDV may calculate the information of the touch event of the user based on mutual capacitance information in the sensing pattern layers SP adjacent to the fingerprint sensing area FSA (for example, may be referred to as adjacent sensing pattern layers).

According to one or more embodiments, the trace lines TL1 and TL2 may be included in the first conductive pattern layer CP1. The trace lines TL1 and TL2 may be covered by the first insulating layer INS1. The first trace line TL1, the second trace line TL2, and the first bridge pattern layers BRP1 may be disposed on a same layer (e.g., the base layer BSL). The first trace line TL1, the second trace line TL2, and the first fingerprint sensing pattern layer FP1 may be disposed on different layers, respectively. The first trace line TL1, the second trace line TL2, and the second fingerprint sensing pattern layer FP2 may be disposed on a same layer (e.g., the base layer BSL).

According to one or more embodiments, the first trace line TL1, the second trace line TL2, and the cell electrodes C1 and C2 of the sensing pattern layers SP may be disposed on different layers, respectively. For example, as described above, the first trace line TL1 and the second trace line TL2 may be included in the first conductive pattern layer CP1 and may be disposed on the first layer (e.g., the base layer BSL), and the cell electrodes C1 and C2 of the sensing pattern layers SP may be included in the second conductive pattern layer CP2 and may be disposed on the second layer (e.g., the first insulating layer INS1). For example, the cell electrodes C1 and C2 of the sensing pattern layers SP for obtaining the information of the touch input may be disposed relatively adjacent to an outside of the panel PNL, and a touch specification of the user may be improved.

For example, the first bridge pattern layers BRP1 among the sensing pattern layers SP may be included in the first conductive pattern layer CP1 and may be disposed on the first layer (e.g., the base layer BSL) as described above. Since the first bridge pattern layers BRP1 are disposed on a same layer as the trace lines TL1 and TL2, overlapping with each other is required to be avoided. According to one or more embodiments, the trace lines TL1 and TL2 may not overlap the sensing pattern layers SP, e.g., the first bridge pattern layers BRP1.

For example, the trace lines TL1 and TL2 may overlap first cell electrodes C1 of the first sensing pattern layers SP1 and second cell electrodes C2 of the second sensing pattern layers SP2 in a plan view (refer to FIG. 7). The trace lines TL1 and TL2 may not overlap the bridge pattern layers BRP in a plan view (refer to FIG. 13). For example, the bridge pattern layer BRP may include the first bridge pattern layers BRP1 and the second bridge pattern layers BRP2 described above. For example, the trace lines TL1 and TL2 may not overlap the first bridge pattern layers BRP1 in a plan view.

According to one or more embodiments, the trace lines TL1 and TL2 may be disposed (or patterned) to bypass an area in which the first bridge pattern layers BRP1 are disposed so as not to overlap the first bridge pattern layers BRP1. For example, the trace lines TL1 and TL2 formed based on the first conductive pattern layer CP1 (e.g., disposed on the first layer) may be physically separated (or spaced apart) from the first bridge pattern layers BRP1 formed based on the first conductive pattern layer CP1 (e.g., disposed on the first layer), and thus the fingerprint information of the user obtained from the fingerprint sensing area FSA may be applied (or provided) to the fingerprint sensing pads FTP and FRP through the trace lines TL1 and TL2.

According to one or more embodiments, at least a portion of each of the trace lines TL1 and TL2 may be bent so that the trace lines TL1 and TL2 may bypass the area in which the first bridge pattern layers BRP1 are disposed. For example, at least a portion of each of the trace lines TL1 and TL2 may have a curved shape. In another example, at least a portion of each of the trace lines TL1 and TL2 may be bent one or more times. For example, a portion of the trace lines TL1 and TL2 most adjacent to the first bridge pattern layers BRP1 may have a shape extending along an edge line of the area in which the first bridge pattern layers BRP1 are disposed.

According to one or more embodiments, the trace lines TL1 and TL2 may extend in a direction. For example, at least a portion of the trace lines TL1 and TL2 may extend from the fingerprint sensing area FSA toward the pad area PDA.

According to one or more embodiments, trace lines TL1 and TL2 may be formed and may be spaced apart from each other by a distance (refer to FIG. 16). For example, in case that the trace lines TL1 and TL2 included in the first conductive pattern layer CP1 and disposed on the first layer (e.g., the base layer BSL) are spaced apart by a distance and disposed on a same layer, the trace lines TL1 and TL2 may be physically separated (or spaced apart) from the second bridge pattern layer BRP2.

For example, the first cell electrodes C1 of the first sensing pattern layers SP1 included in the second conductive pattern layer CP2 and disposed on the second layer (e.g., the first insulating layer INS1) may overlap the trace lines TL1 and TL2 in a plan view. For example, each of pattern layers for forming the first cell electrodes C1 of the first sensing pattern layers SP1 may overlap each of pattern layers for forming the trace lines TL1 and TL2 in a plan view. For example, each of pattern layers for forming the second cell electrodes C2 of the second sensing pattern layers SP2 may overlap each of pattern layers for forming the trace lines TL1 and TL2 in a plan view. According to one or more embodiments, an area where the trace lines TL1 and TL2 and the sensing pattern layers SP overlap may overlap a light blocking layer (refer to 'LBL' of FIG. 20). Details regarding this are described below.

According to one or more embodiments, the display device DD in which the fingerprint sensing area FSA may be formed in the display area DA and/or the sensing area SA may be formed. In order to form the fingerprint sensing area FSA in the display area DA and/or the sensing area SA, a line for applying an electrical signal obtained (or sensed) from the fingerprint sensing area FSA to the sensor driver SDV may be formed in the display area DA and/or the sensing area SA. In order for the display device DD to simultaneously sense the touch input and the fingerprint input, the sensing pattern layers SP may be be patterned over the sensing area SA. According to one or more embodiments, a line structure in which the trace lines TL1 and TL2 may be electrically separated (or spaced apart) from the sensing pattern layers SP may be formed. For example, the cell electrodes C1 and C2 of the sensing pattern layers SP may be formed outside, and the trace lines TL1 and TL2 may be disposed below compared to the cell electrodes C1 and C2 of the sensing pattern layers SP. Therefore, the electrical signal obtained from the fingerprint sensing area FSA disposed inside the sensing area SA may be appropriately moved to an outside of the sensing area SA without damaging touch sensitivity of the sensing pattern layers SP.

According to one or more embodiments, the sensing pattern layers SP (for example, the cell electrodes C1 and C2) may overlap the trace lines TL1 and TL2 in a plan view, and thus the sensing pattern layers SP may cover the trace lines TL1 and TL2. For example, the sensing pattern layers SP may function as a shielding member for the trace lines TL1 and TL2. For example, even in a case where the touch event of the user occurs in an area overlapping the trace lines TL1 and TL2 in a plan view, the fingerprint information of the user obtained from the fingerprint sensing area FSA may be moved without additional distortion through the trace lines TL1 and TL2. For example, a shape of the sensing pattern layers SP, in an area where the trace lines TL1 and TL2 are disposed, and a shape of the sensing pattern layers SP in other areas may be same as each other. Accordingly, regardless of disposition of the trace lines TL1 and TL2, the touch sensitivity may be uniformly determined throughout the sensing area SA.

For example, according to one or more embodiments, a fingerprint sensor and a touch sensor may be formed in a limited stack structure to provide a display device DD having a thin thickness. For example, the display device DD may be readily implemented as a flexible display device.

Figure 17:
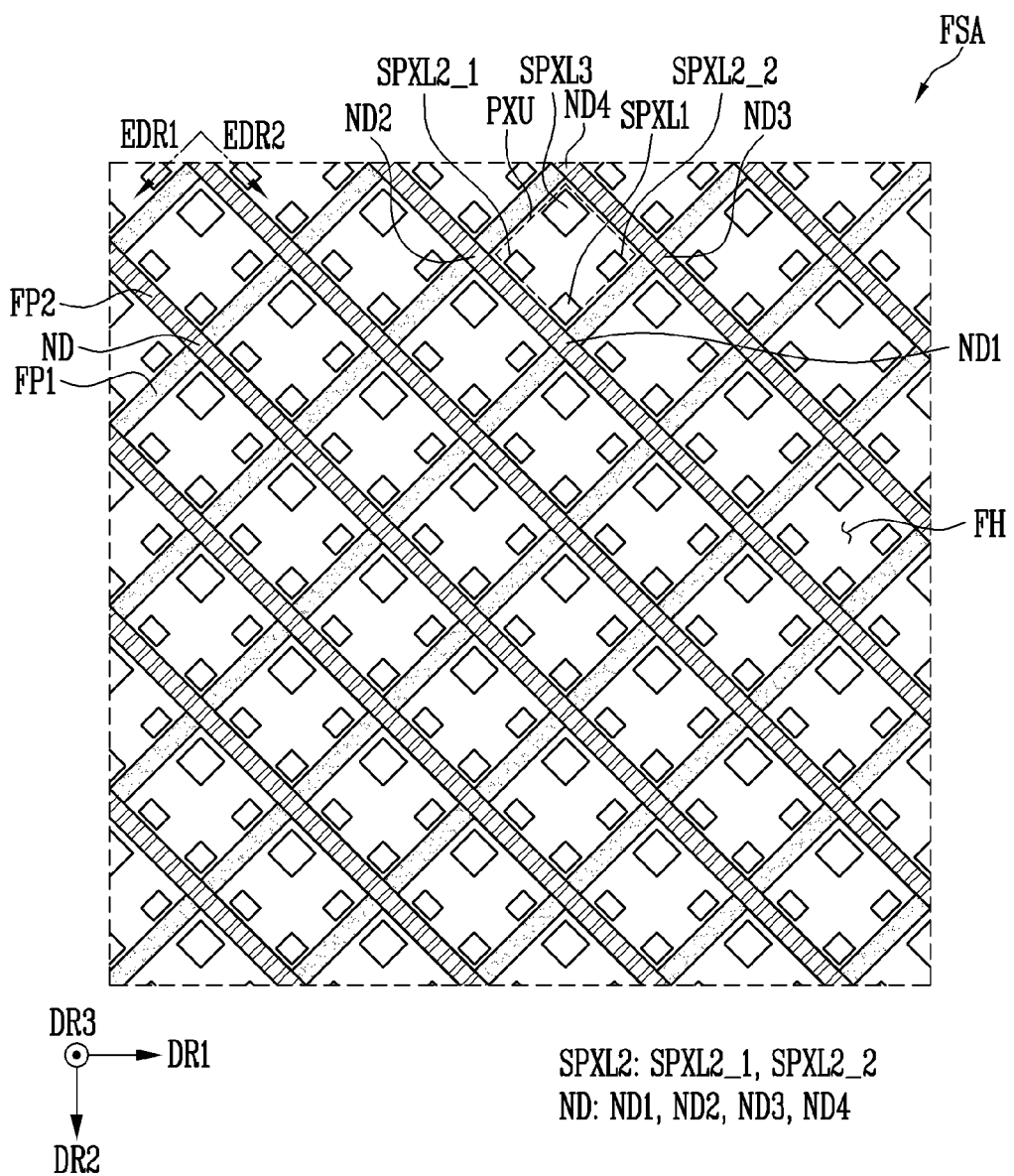
FIG. 17 is a schematic plan view illustrating a position relationship between a pixel unit and a fingerprint sensing pattern.

For example, a position relationship between the pixel unit PXU and the fingerprint sensing pattern layers FP1 and FP2 in the fingerprint sensing area FSA is described with reference to FIG. 17. FIG. 17 is a schematic plan view illustrating the position relationship between the pixel unit and the fingerprint sensing pattern layer. Redundant descriptions above are simplified or are omitted for descriptive convenience.

An area (for example, fingerprint area holes FH) defined by the fingerprint sensing pattern layers FP1 and FP2 in the fingerprint sensing area FSA may correspond to an area in which the sub-pixels SPXL1, SPXL2, and SPXL3 are disposed.

As described above, the first fingerprint sensing pattern layer FP1 may extend in the first extension direction EDR1, the second fingerprint sensing pattern layer FP2 may extend in the second extension direction EDR2, and the first fingerprint sensing pattern layer FP1 and the second fingerprint sensing pattern layer FP2 may intersect to form the sensing nodes ND. For example, the sensing nodes ND may define the fingerprint area holes FH in a plan view. For example, the fingerprint area holes FH may be surrounded by the first fingerprint sensing pattern layer FP1 and the second fingerprint sensing pattern layer FP2 in a plan view. The fingerprint area holes FH may be arranged in a matrix form according to an arrangement of the first fingerprint sensing pattern layer FP1 and the second fingerprint sensing pattern layer FP2.

According to one or more embodiments, the fingerprint area holes FH may overlap the pixel unit PXU in a plan view. For example, the pixel unit PXU may be disposed in each of the fingerprint area holes FH. For convenience of description, one or more embodiments in which the sub-pixels SPXL1, SPXL2, and SPXL3 are arranged according to a PENTILE™ arrangement structure is shown in FIG. 17, and the implementation structure is described based on this. According to one or more embodiments, the resolution of the pixels PXL may be $\sqrt{2}$ times of the resolution of the fingerprint sensor. However, embodiments are not limited thereto, and according to one or more embodiments, the resolution of the pixels PXL and the resolution of the fingerprint sensor may be same as each other.

According to one or more embodiments, the second sub-pixel SPXL2 that emits light of the second color may include a (2_1)-th sub-pixel SPXL2_1 and a (2_2)-th sub-pixel SPXL2_2. Accordingly, the pixel SPXL may include four types of sub-pixels SPXL1, SPXL2_1, SPXL2_2, and SPXL3. The sub-pixels SPXL1, SPXL2_1, SPXL2_2, and SPXL3 may be disposed in each of the fingerprint area holes FH, and positions of the sub-pixels SPXL1, SPXL2_1, SPXL2_2, and SPXL3 may correspond to the sensing nodes ND defining the fingerprint area holes FH.

For example, the positions of the sub-pixels SPXL1, SPXL2_1, SPXL2_2, and SPXL3 may be defined by four sensing nodes ND of each of the fingerprint area holes FH. The first sub-pixel SPXL1 of the pixel unit PXU may be adjacent to a first sensing node ND1 among the sensing nodes ND of one fingerprint area hole FH, the (2_1)-th sub-pixel SPXL2_1 of the pixel unit PXU may be adjacent to a second sensing node ND2 among the sensing nodes ND of one fingerprint area hole FH, the (2_2)-th sub-pixel SPXL2_2 of the pixel unit PXU may be adjacent to a third sensing node ND3 among the sensing nodes ND of one fingerprint area hole FH, and the third sub-pixel SPXL3 of the pixel unit PXU may be adjacent to a fourth sensing node ND4 among the sensing nodes ND of one fingerprint area hole FH. Accordingly, light emitted from the sub-pixels SPXL1, SPXL2_1, SPXL2_2, and SPXL3 may not be interfered by the fingerprint sensing pattern layers FP1 and FP2, and the light output efficiency of the pixel PXL may be improved without deterioration or degradation of a luminance.

For example, an arrangement structure of the pixels PXL according to one or more embodiments is not limited to that shown in FIG. 17. As described above, the pixels PXL may be arranged in various structures including a stripe structure, and the position relationship between the pixel unit PXU and the fingerprint sensing pattern layers FP1 and FP2 may be determined in a method similar to this.

Figure 18:
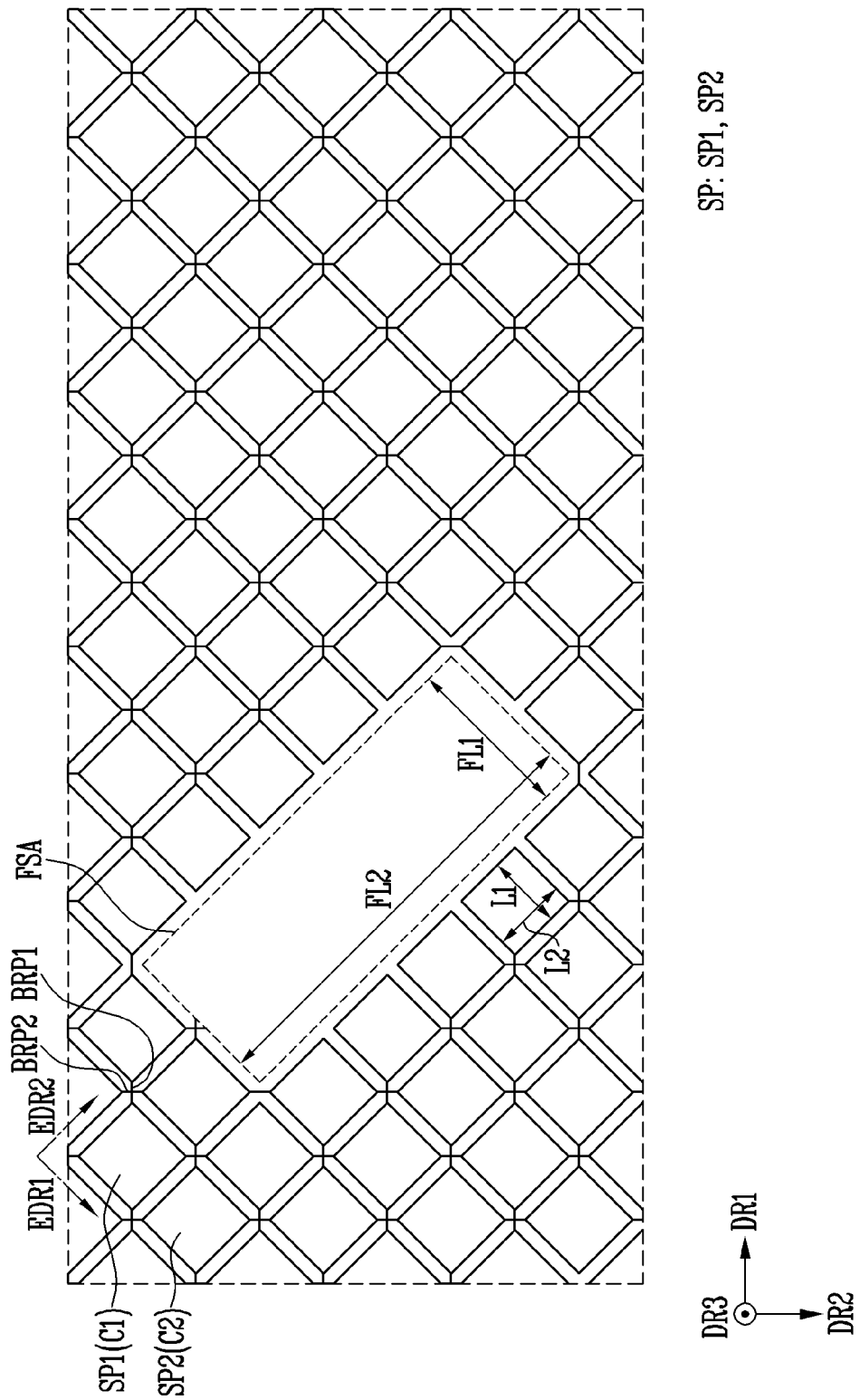
FIG. 18 is a schematic plan view illustrating a shape relationship between a fingerprint sensing area and sensing pattern layers.

For example, a shape and a structure relationship of the fingerprint sensing area FSA and the sensing pattern layers SP are described with reference to FIG. 18. FIG. 18 is a schematic plan view illustrating a shape relationship between the fingerprint sensing area and the sensing pattern layers. Redundant descriptions above are simplified or are omitted for descriptive convenience.

According to one or more embodiments, a shape of the fingerprint sensing area FSA and a length of each of sides may be defined as a minimum unit of a length of each of sides of the sensing pattern layers SP. For example, a first side of the fingerprint sensing area FSA and a first side of the sensing pattern layers SP may extend in a first extension direction EDR1, and a second side of the fingerprint sensing area FSA and a second side of the sensing pattern layers SP may extend in a second extension direction EDR2. For example, the first and second sides of the fingerprint sensing area FSA and the first and second sides of the sensing pattern layers SP may be substantially parallel to each other.

A first fingerprint area length FL1, which is the length of the first side of the fingerprint sensing area FSA, may be about n times (where n is a natural number equal to or greater than 1) of a first sensing area length L1, which is the length of the first side of the sensing pattern layers SP (for example, the cell electrodes C1 and C2 of the sensing pattern layers SP). A second fingerprint area length FL2, which is the length of the second side of the fingerprint sensing area FSA, may be about m times (where m is a natural number equal to or greater than 1) of a second sensing area length L1, which is the length of the second side of the sensing pattern layers SP (for example, the cell electrodes C1 and C2 of the sensing pattern layers SP). For example, n and m may be determined independently of each other. For example, n and m may be identical to each other or different from each other. n may be greater than m, or n may be less than m. FIG. 18 shows one or more embodiments of a fingerprint sensing area FSA in which n is 2 and m is 4. For example, values of n and m may include a predetermined error range in one natural number value. For example, the values of n and m may include as much as ±10% of a determined natural number value.

As described above, the shape of the fingerprint sensing area FSA may be patterned to correspond to a structure of the sensing pattern layers SP. For example, the shape of the fingerprint sensing area FSA may be appropriately changed according to fingerprint sensing performance of the fingerprint sensor. For example, in order to sufficiently ensure the resolution of the fingerprint sensor, an area of the fingerprint sensing area FSA may be expanded (for example, increase n or m). For example, a structure of the fingerprint sensing area FSA may be designed to correspond to the sensing pattern layers SP, and thus algorithm design for compensating for the touch event of the user that is occurred in the fingerprint sensing area FSA may be readily performed.

Figure 19:
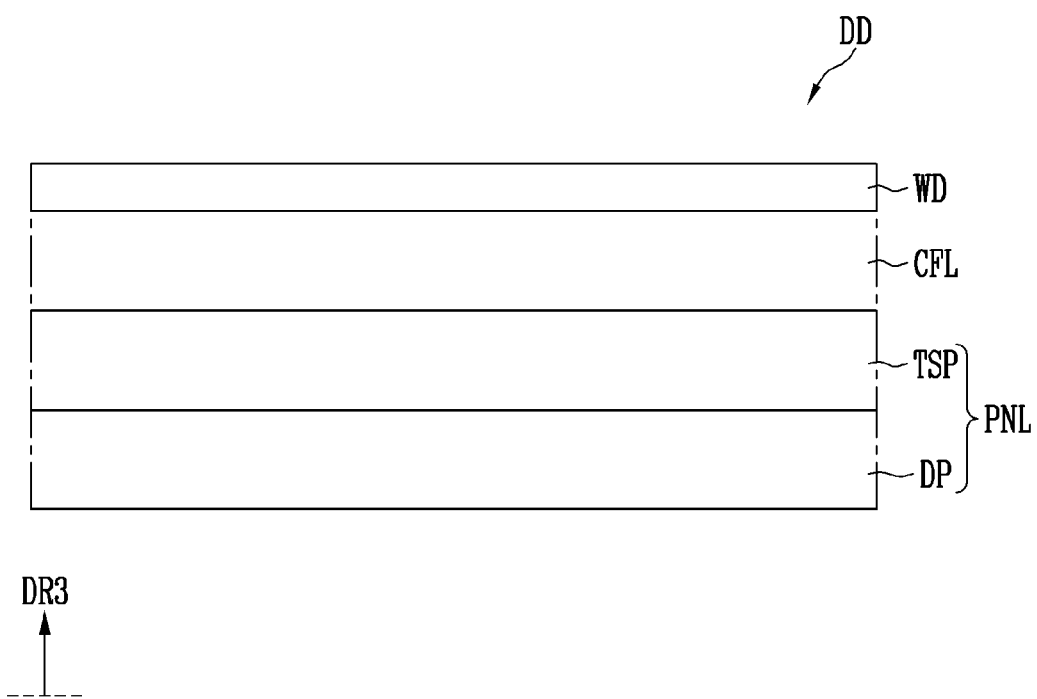
FIG. 19 is a schematic cross-sectional view illustrating a stack structure of a display device according to an embodiment.
Figure 20:
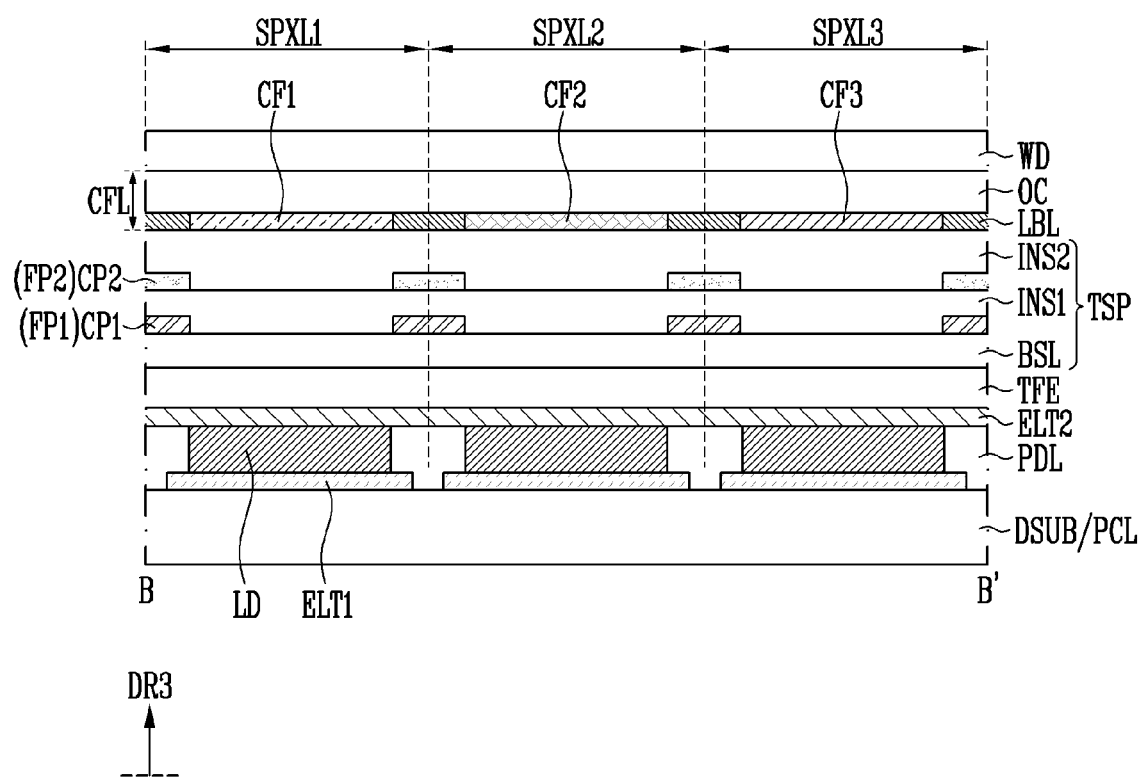
FIG. 20 is a schematic cross-sectional view taken along line B-B' of FIG. 7 illustrating sub-pixels included in a display device according to an embodiment.

In another example, a display device DD is described with reference to FIGS. 19 and 20. FIG. 19 is a schematic cross-sectional view illustrating a stack structure of a display device DD according to an embodiment. FIG. 20 is a schematic cross-sectional view taken along line B-B' of FIG. 7 illustrating sub-pixels SPXL1, SPXL2, and SPXL3 included in a display device DD according to an embodiment. Redundant descriptions above are simplified or are omitted for descriptive convenience.

The display device DD according to an embodiment is different from the display device DD according to the above-described embodiment (for example, FIG. 3), in that the display device DD according to an embodiment further includes a color filter layer CFL. Referring to FIGS. 19 and 20, the color filter layer CFL may include color filters CF1, CF2, and CF3 capable of selectively transmitting light of one color. Accordingly, light of a color corresponding to each of the sub-pixels SPXL1, SPXL2, and SPXL3 may be emitted, and the display device DD may more clearly display a full-color image.

The color filter layer CFL may be disposed on the sensor unit TSP. For example, the color filter layer CFL may be disposed between the sensor unit TSP and the window WD. The color filter layer CFL may be disposed on the second insulating layer INS2.

The color filter layer CFL may include a first color filter CF1 disposed in the first sub-pixel SPXL1 and selectively transmitting light emitted from the first sub-pixel SPXL1, a second color filter CF2 disposed in the second sub-pixel SPXL2 and selectively transmitting light emitted from the second sub-pixel SPXL2, and a third color filter CF3 disposed in the third sub-pixel SPXL3 and selectively transmitting light emitted from the third sub-pixel SPXL3. The color filter layer CFL may further include a light blocking layer LBL and an overcoat layer OC.

In one or more embodiments, the first color filter CF1, the second color filter CF2, and the third color filter CF3 may be a red color filter, a green color filter, and a blue color filter, respectively. However, embodiments are not limited thereto.

The first color filter CF1 may include a color filter material selectively transmitting light of the first color (or red). In case that the first sub-pixel SPXL1 is a red pixel, the first color filter CF1 may include a red color filter material. The second color filter CF2 may include a color filter material selectively transmitting light of the second color (or green). In case that the second sub-pixel SPXL2 is a green pixel, the second color filter CF2 may include a green color filter material. The third color filter CF3 may include a color filter material selectively transmitting light of the third color (or blue). In case that the third sub-pixel SPXL3 is a blue pixel, the third color filter CF3 may include a blue color filter material.

According to one or more embodiments, the light blocking layer LBL may be disposed between the first to third sub-pixels SPXL1, SPXL2, and SPXL3 (or between the first to third color filters CF1, CF2, and CF3). In case that the light blocking layer LBL is formed between the first to third sub-pixels SPXL1, SPXL2, and SPXL3 (or between the first to third color filters CF1, CF2, and CF3), a color mixing defect visually recognized from a front surface or a side surface of the display device DD may be prevented. The light blocking layer LBL may include various light blocking materials. For example, the light blocking layer LBL may include a black matrix. In another example, the light blocking layer LBL may have a structure in which the first to third color filters CF1, CF2, and CF3 are stacked.

The overcoat layer OC may be disposed on the light blocking layer LBL and the first to third color filters CF1, CF2, and CF3. The overcoat layer OC may be formed over the first to third sub-pixels SPXL1, SPXL2, and SPXL3. The overcoat layer OC may cover members/elements disposed thereunder, and may prevent moisture or air from penetrating into the members/elements under the overcoat layer OC. For example, the overcoat layer OC may protect the members/elements disposed thereunder from a foreign substance such as dust.

The overcoat layer OC may include an organic material such as an acrylic resin, an epoxy resin, a phenolic resin, a polyamide resin, a polyimide resin, a polyester resin, a polyphenylenesulfide resin, or benzocyclobutene (BCB). However, embodiments are not limited thereto, and the overcoat layer OC may include various types of inorganic materials including silicon oxide ($SiO_x$), silicon nitride ($SiN_x$), silicon oxynitride ($SiO_xN_y$), aluminum nitride ($AlN_x$), aluminum oxide ($Al_xO_y$), zirconium oxide ($ZrO_x$), hafnium oxide ($HfO_x$), or titanium oxide ($TiO_x$).

According to one or more embodiments, the first conductive pattern layer CP1 and the second conductive pattern layer CP2 for forming the sensing pattern layers SP, the fingerprint sensing pattern layers FP1 and FP2, and the trace lines TL1 and TL2 may overlap the light blocking layer LBL in a plan view. According to one or more embodiments, the first conductive pattern layer CP1 and the second conductive pattern layer CP2 for forming the sensing pattern layers SP, the fingerprint sensing pattern layers FP1 and FP2, and the trace lines TL1 and TL2 may overlap the pixel defining layer PDL in a plan view. For example, the first conductive pattern layer CP1 and the second conductive pattern layer CP2 may be prevented from being visually recognized from the outside, and visibility of the display device DD may be substantially improved.

In concluding the detailed description, those skilled in the art will appreciate that many variations and modifications may be made to the embodiments without substantially departing from the principles and spirit and scope of the disclosure. Therefore, the disclosed embodiments are used in a generic and descriptive sense only and not for purposes of limitation.

What is claimed is:

1. A sensing panel comprising:
   a touch sensor that obtains information of a touch input in a sensing area; and
   a biometric sensor that obtains biometric information in a biometric sensing area the biometric sensing area being surrounded by the sensing area in a plan view, wherein
   the touch sensor includes sensing pattern layers in the sensing area,
   the sensing pattern layers include cell electrodes and bridge electrodes electrically connecting the cell electrodes,
   the biometric sensor includes:
   biometric sensing pattern layers in the biometric sensing area, and
   trace lines electrically connected to the biometric sensing pattern layers, wherein
   the trace lines and at least a portion of the bridge electrodes are directly disposed on a same layer, the trace lines bypassing the bridge electrodes in a plan view, and
   the trace lines electrically connect the biometric sensing pattern layers and a biometric sensing pad disposed outside the sensing area.

2. The sensing panel of claim 1, wherein the biometric sensing area overlaps the biometric sensing pattern layers and does not overlap the sensing pattern layers in a plan view.

3. The sensing panel of claim 1, wherein
   the biometric sensing pattern layers include first biometric sensing pattern layers extending in a first extension direction and second biometric sensing pattern layers extending in a second extension direction different from the first extension direction, and
   sensing nodes are formed in an area where the first biometric sensing pattern layers and the second biometric sensing pattern layers overlap each other.

4. The sensing panel of claim 3, wherein
   the first biometric sensing pattern layers and the second biometric sensing pattern layers are disposed on different layers, and
   the second biometric sensing pattern layers and the cell electrodes of the sensing pattern layers are disposed on a same layer.

5. The sensing panel of claim 4, wherein
   the trace lines include a first trace line and a second trace line,
   the first biometric sensing pattern layers and the first and second trace lines are disposed on different layers,
   the second biometric sensing pattern layers, the first trace line, and the second trace line are disposed on a same layer,
   the first biometric sensing pattern layers are electrically connected to the first trace line through a contact member passing through an insulating layer between the first trace line and the first biometric sensing pattern layers.

6. The sensing panel of claim 1, wherein
at least a portion of the trace lines is disposed in the sensing area.

7. The sensing panel of claim 1, wherein
the sensing pattern layers include first sensing pattern layers and second sensing pattern layers,
the first sensing pattern layers include first cell electrodes of the cell electrodes and first bridge electrodes of the bridge electrodes,
the second sensing pattern layers include second cell electrodes of the cell electrodes and second bridge electrodes of the bridge electrodes,
the first bridge electrodes and the trace lines are disposed on a first layer, and
the first cell electrodes, the second cell electrodes, and the second bridge electrodes are disposed on a second layer different from the first layer.

8. The sensing panel of claim 1, wherein the cell electrodes of the sensing pattern layers cover the trace lines.

9. The sensing panel of claim 1, wherein
at least a portion of the trace lines have a curved shape to be spaced apart from the bridge electrodes,
the biometric sensor is a fingerprint sensor,
the biometric sensing area is a fingerprint sensing area,
the biometric information is fingerprint information, and
the biometric sensing pattern layers are fingerprint sensing pattern layers.

10. The sensing panel of claim 1, wherein
the sensing panel is configured to operate in a biometric sensing mode or a touch sensing mode,
in case that the sensing panel operates in the biometric sensing mode, a sensor driver of the sensing panel processes biometric information of a biometric provided in the biometric sensing area,
in case that the sensing panel operates in the touch sensing mode and in case that a touch event occurs in the biometric sensing area, the sensor driver is configured to obtain information of the touch event based on mutual capacitance information in the sensing pattern layers.

11. The sensing panel of claim 1, wherein
a first length of the biometric sensing area extending in a first extension direction is substantially n times of a first length of each of the sensing pattern layers extending in the first extension direction,
a second length of the biometric sensing area extending in a second extension direction different from the first extension direction is substantially m times of a second length of each of the sensing pattern layers extending in the second extension direction, and
n and m are natural numbers.

12. The sensing panel of claim 1, wherein
the cell electrodes of the sensing pattern layers have a mesh pattern,
the sensing pattern layers include first sensing pattern layers and second sensing pattern layers, and
the first sensing pattern layers and the second sensing pattern layers have a same shape.

13. The sensing panel of claim 1, wherein
the biometric sensing pattern layers include first biometric sensing pattern layers and second biometric sensing pattern layers,
the biometric sensor is configured to obtain the biometric information based on mutual capacitance information of the first biometric sensing pattern layers and the second biometric sensing pattern layers.

14. The sensing panel of claim 1, wherein at least a portion of the trace lines are bent in an arc to bypass the bridge electrodes.

15. A display device comprising:
a display panel including pixels that emit light; and
a sensing panel disposed on the display panel, the sensing panel including:
a touch sensor that obtains information of a touch input in a sensing area, and
a biometric sensor that obtains biometric information in a biometric sensing area,
the biometric sensing area being surrounded by the sensing area, wherein
the touch sensor includes sensing pattern layers disposed in the sensing area,
the sensing pattern layers include cell electrodes and bridge electrodes electrically connecting the cell electrodes,
the biometric sensor includes:
biometric sensing pattern layers disposed in the biometric sensing area, and
trace lines electrically connected to the biometric sensing pattern layers, and
the trace lines and at least a portion of the bridge electrodes are disposed directly on a same layer, the trace lines bypassing the bridge electrodes in a plan view, and
the trace lines electrically connect the biometric sensing pattern layers and a biometric sensing pad disposed outside the sensing area.

16. The display device of claim 15, wherein
the sensing pattern layers include first sensing pattern layers and second sensing pattern layers,
the first sensing pattern layers include first cell electrodes of the cell electrodes and first bridge electrodes of the bridge electrodes,
the second sensing pattern layers include second cell electrodes of the cell electrodes and second bridge electrodes of the bridge electrodes,
the first bridge electrodes and the trace lines are disposed on a first layer, and
the first cell electrodes, the second cell electrodes, and the second bridge electrodes are disposed on a second layer different from the first layer.

17. The display device of claim 15, further comprising:
a color filter layer disposed on the sensing panel, wherein
the color filter layer includes color filters and a light blocking layer disposed between the color filters, and
the light blocking layer overlaps conductive layers forming the sensing pattern layers, the biometric sensing pattern layers, and the trace lines in a plan view.

18. The display device of claim 15, wherein a resolution of the pixels is about $\sqrt{2}$ times of a resolution of the biometric sensor in the biometric sensing area.

19. The display device of claim 15, wherein
each of the pixels includes pixel units, each pixel unit including a first sub-pixel, a (2_1)-th sub-pixel, a (2_2)-th sub-pixel, and a third sub-pixel,
the biometric sensing pattern layers include:
first biometric sensing pattern layers extending in a first extension direction, and
second biometric sensing pattern layers extending in a second extension direction different from the first extension direction,
the first biometric sensing pattern layers and the second biometric sensing pattern layers intersect to form a plurality of sensing nodes, the plurality of sensing nodes define biometric area holes in a plan view, and include a first node, a second node, a third node, and a fourth node,
the first sub-pixel is adjacent to the first node,
the (2_1)-th sub-pixel is adjacent to the second node,
the (2_2)-th sub-pixel is adjacent to the third node, and
the third sub-pixel is adjacent to the fourth node.

20. The display device of claim 15, wherein
the display device is a flexible display device,
the biometric sensor is a fingerprint sensor,
the biometric sensing area is a fingerprint sensing area,
the biometric information is fingerprint information, and
the biometric sensing pattern layers are fingerprint sensing pattern layers.

* * * * *